United States Patent
Nakagawa

(10) Patent No.: US 11,539,833 B1
(45) Date of Patent: Dec. 27, 2022

(54) ROBUST STEP-SIZE CONTROL FOR MULTI-CHANNEL ACOUSTIC ECHO CANCELLER

(71) Applicant: Amazon Technologies, Inc., Seattle, WA (US)

(72) Inventor: Carlos Renato Nakagawa, San Jose, CA (US)

(73) Assignee: Amazon Technologies, Inc., Seattle, WA (US)

( * ) Notice: Subject to any disclaimer, the term of this patent is extended or adjusted under 35 U.S.C. 154(b) by 255 days.

(21) Appl. No.: 16/739,819

(22) Filed: Jan. 10, 2020

(51) Int. Cl.
  - *H04M 3/00* (2006.01)
  - *H04R 3/02* (2006.01)
  - *H04M 9/08* (2006.01)
  - *G10L 21/0208* (2013.01)

(52) U.S. Cl.
  CPC ........... *H04M 3/002* (2013.01); *H04M 9/082* (2013.01); *H04R 3/02* (2013.01); *G10L 21/0208* (2013.01)

(58) Field of Classification Search
  CPC ........ H04M 3/002; H04M 9/082; H04R 3/02; G10L 21/0208
  See application file for complete search history.

(56) References Cited

U.S. PATENT DOCUMENTS

| | | | | |
|---|---|---|---|---|
| 4,629,829 A | * | 12/1986 | Puhi | H04B 3/23 379/390.02 |
| 4,800,517 A | * | 1/1989 | Asghar | G06F 15/7896 708/518 |
| 7,050,545 B2 | * | 5/2006 | Tanrikulu | H04M 9/082 379/406.01 |
| 7,069,286 B2 | * | 6/2006 | Gay | H03H 21/0043 708/322 |
| 7,346,012 B2 | * | 3/2008 | Stapler | H04B 3/23 379/406.05 |
| 11,189,297 B1 | * | 11/2021 | Nakagawa | H04R 3/02 |
| 11,205,438 B1 | * | 12/2021 | Chhetri | G10L 15/22 |
| 2001/0043650 A1 | * | 11/2001 | Sommer | H03H 21/0012 375/232 |
| 2003/0112966 A1 | * | 6/2003 | Halder | H04B 3/23 379/406.05 |
| 2003/0140075 A1 | * | 7/2003 | Lis | H04B 3/23 708/322 |

(Continued)

*Primary Examiner* — Lisa Hashem
(74) *Attorney, Agent, or Firm* — Pierce Atwood LLP

(57) ABSTRACT

A multi-channel acoustic echo cancellation (AEC) system that includes a step-size controller that dynamically determines a step-size value for each channel and each tone index on a frame-by-frame basis. The system determines that near-end signals are present by calculating a scaled error and determining that the scaled error exceeds a threshold value. When the scaled error exceeds the threshold value, the system may switch from a first cost function to a second cost function and determine a step-size value using a robust algorithm. The robust algorithm may prevent the system from diverging due to the presence of the near-end signal. For example, the robust algorithm may select a different cost function to determine the step-size value and/or combine different step-size computations, resulting in the step-size value being temporarily reduced. Thus, the robust algorithm may enable the AEC to better model the near-end disturbance statistics while the near-end signal is present.

20 Claims, 15 Drawing Sheets

(56) References Cited

U.S. PATENT DOCUMENTS

| | | | | |
|---|---|---|---|---|
| 2003/0174761 | A1* | 9/2003 | Huang | H04L 25/03038 375/233 |
| 2004/0252826 | A1* | 12/2004 | Tian | H04M 9/082 379/406.08 |
| 2013/0251169 | A1* | 9/2013 | Awano | G10K 11/16 381/66 |
| 2014/0112488 | A1* | 4/2014 | Kim | H04R 3/02 381/66 |
| 2015/0112672 | A1* | 4/2015 | Giacobello | H04M 9/082 704/233 |
| 2017/0064087 | A1* | 3/2017 | Mani | H04M 9/082 |
| 2020/0411029 | A1* | 12/2020 | Zhou | H04M 9/082 |

* cited by examiner

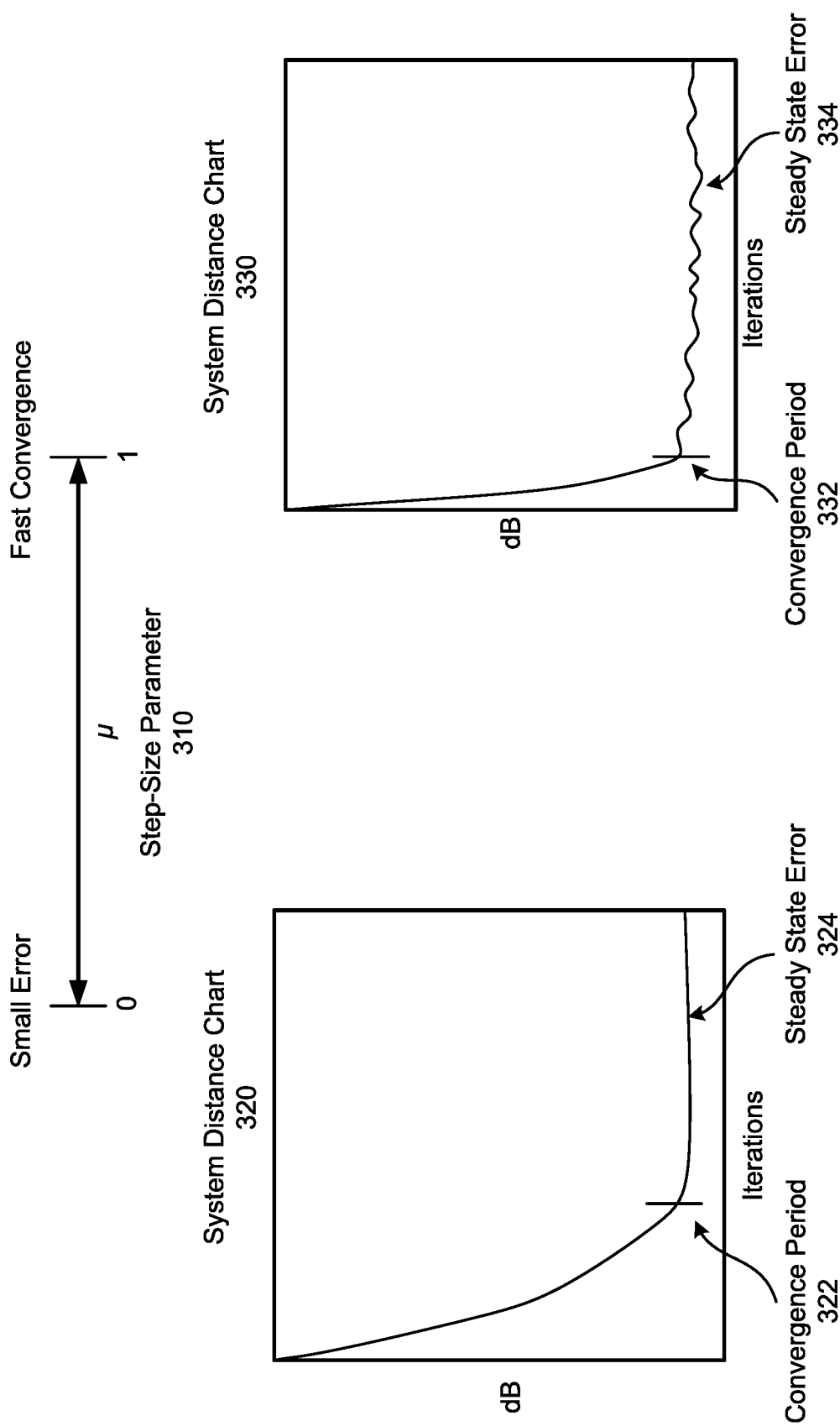

FIG. 4
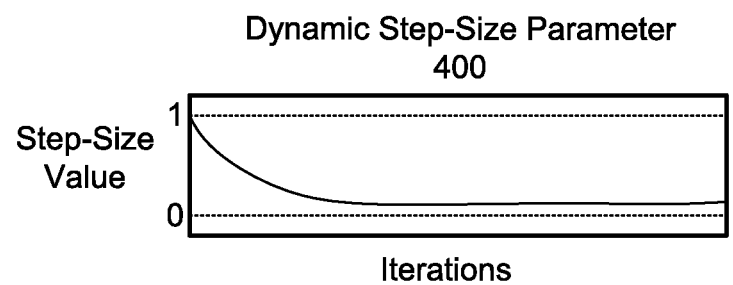
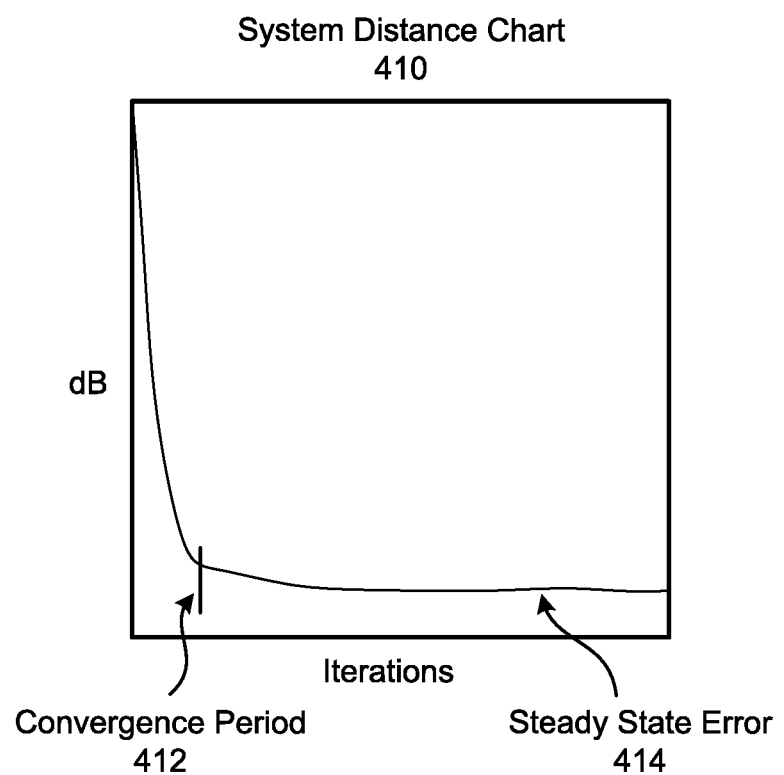

FIG. 6

Robust Variable Step-Size (RVSS) Weight Vector 610

$$w_p(m,n) = \begin{cases} w_p(m, n-1) + \mu \cdot \frac{x_p(m,n)}{\|x_p(m,n)\|^2} \cdot e^*(m,n) & if \ \frac{|e(m,n)|}{\|x_p(m,n)\|} \leq \sqrt{\delta} \\ w_p(m, n-1) + \mu \cdot \sqrt{\delta} \cdot csgn(e(m,n))^* \cdot \frac{x_p(m,n)}{\|x_p(m,n)\|} & if \ \frac{|e(m,n)|}{\|x_p(m,n)\|} > \sqrt{\delta} \end{cases}$$

Robust Variable Step-Size (RVSS) 620

$$\mu_{RVSS} = \min\left[\sqrt{\delta} \cdot \frac{\|x_p(m,n)\|}{|e(m,n)|}, 1\right]$$

RVSS Weight Vector 630

$$w_p(m,n) = w_p(m, n-1) + \mu_{RVSS} \cdot \mu_{fixed} \cdot \frac{x_p(m,n)}{\|x_p(m,n)\|^2} \cdot e^*(m,n)$$

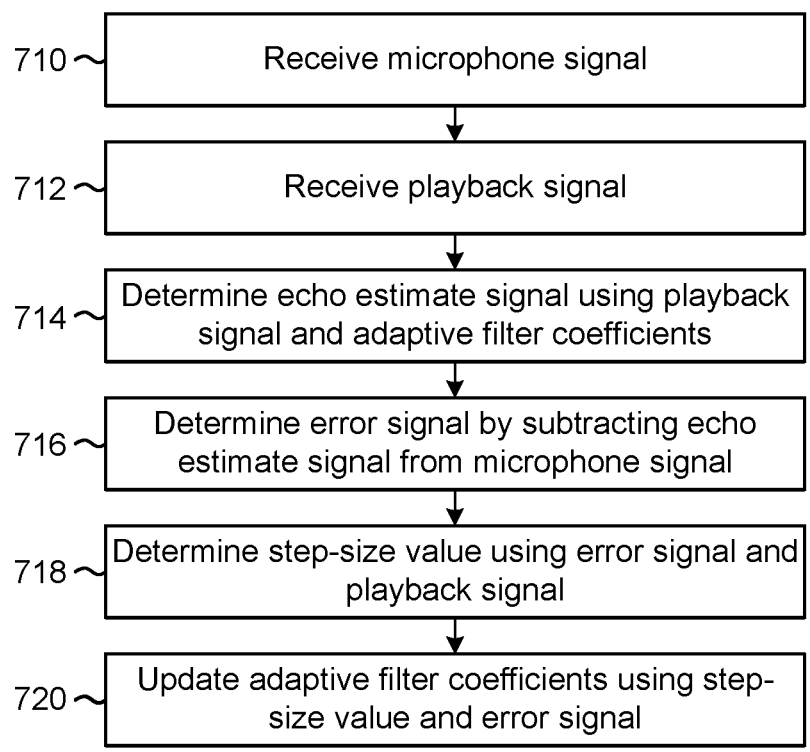

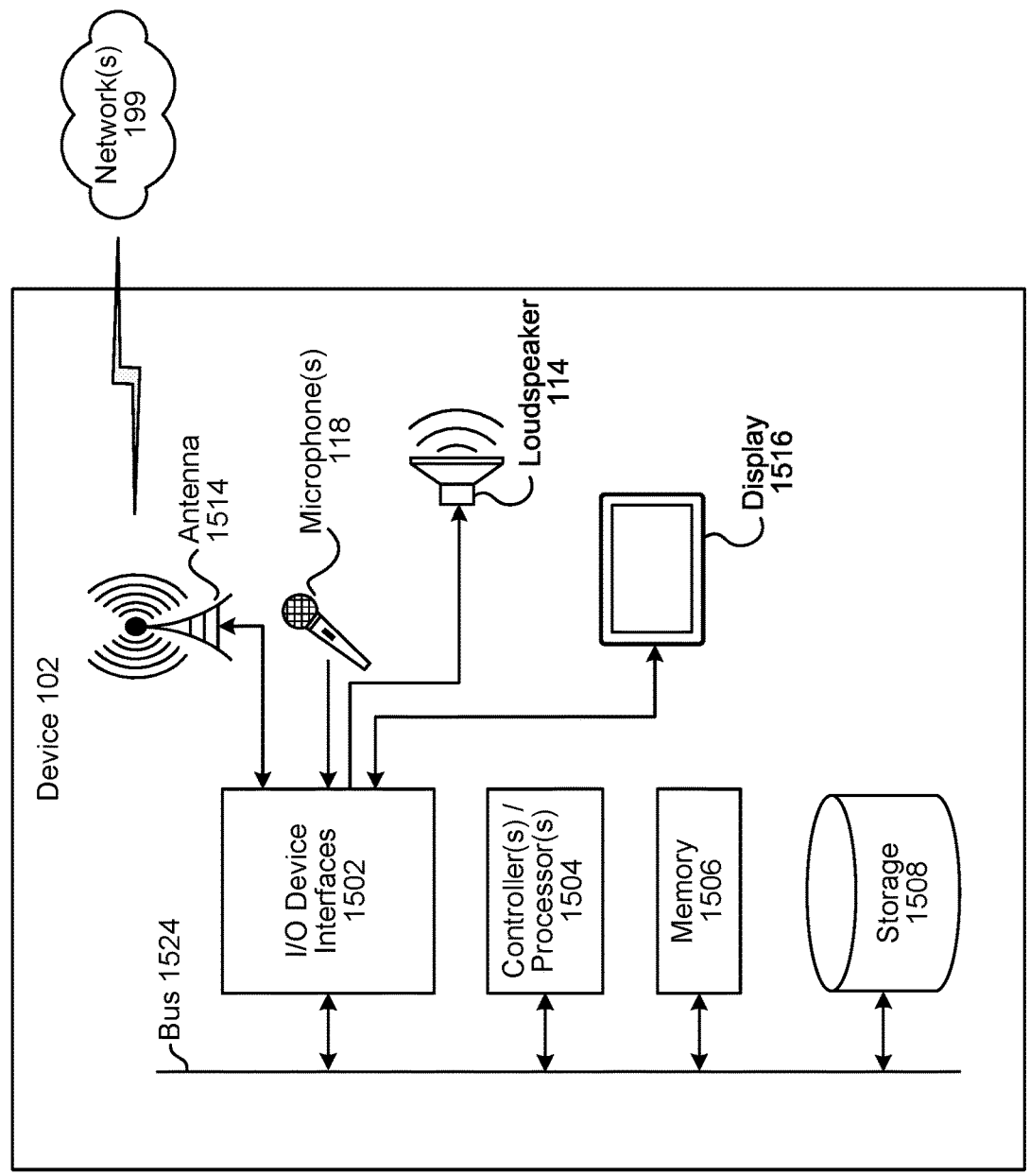

ROBUST STEP-SIZE CONTROL FOR MULTI-CHANNEL ACOUSTIC ECHO CANCELLER

BACKGROUND

In audio systems, automatic echo cancellation (AEC) refers to techniques that are used to recognize when a system has recaptured sound via a microphone after some delay that the system previously output via a speaker. Systems that provide AEC subtract a delayed version of the original audio signal from the captured audio, producing a version of the captured audio that ideally eliminates the "echo" of the original audio signal, leaving only new audio information. For example, if someone were singing karaoke into a microphone while prerecorded music is output by a loudspeaker, AEC can be used to remove any of the recorded music from the audio captured by the microphone, allowing the singer's voice to be amplified and output without also reproducing a delayed "echo" the original music. As another example, a media player that accepts voice commands via a microphone can use AEC to remove reproduced sounds corresponding to output media that are captured by the microphone, making it easier to process input voice commands.

BRIEF DESCRIPTION OF DRAWINGS

For a more complete understanding of the present disclosure, reference is now made to the following description taken in conjunction with the accompanying drawings.

FIG. 3 illustrates examples of convergence periods and steady state error associated with different step-size parameters.

FIG. 4 illustrates an example of a convergence period and steady state error when a step-size parameter is controlled dynamically according to embodiments of the present disclosure.

FIG. 6 illustrates examples of determining a step-size parameter according to embodiments of the present disclosure.

FIG. 7 is a flowchart conceptually illustrating an example method for dynamically controlling a step-size parameter according to embodiments of the present disclosure.

FIG. 15 is a block diagram conceptually illustrating example components of a system for echo cancellation according to embodiments of the present disclosure.

DETAILED DESCRIPTION

Figure 1:
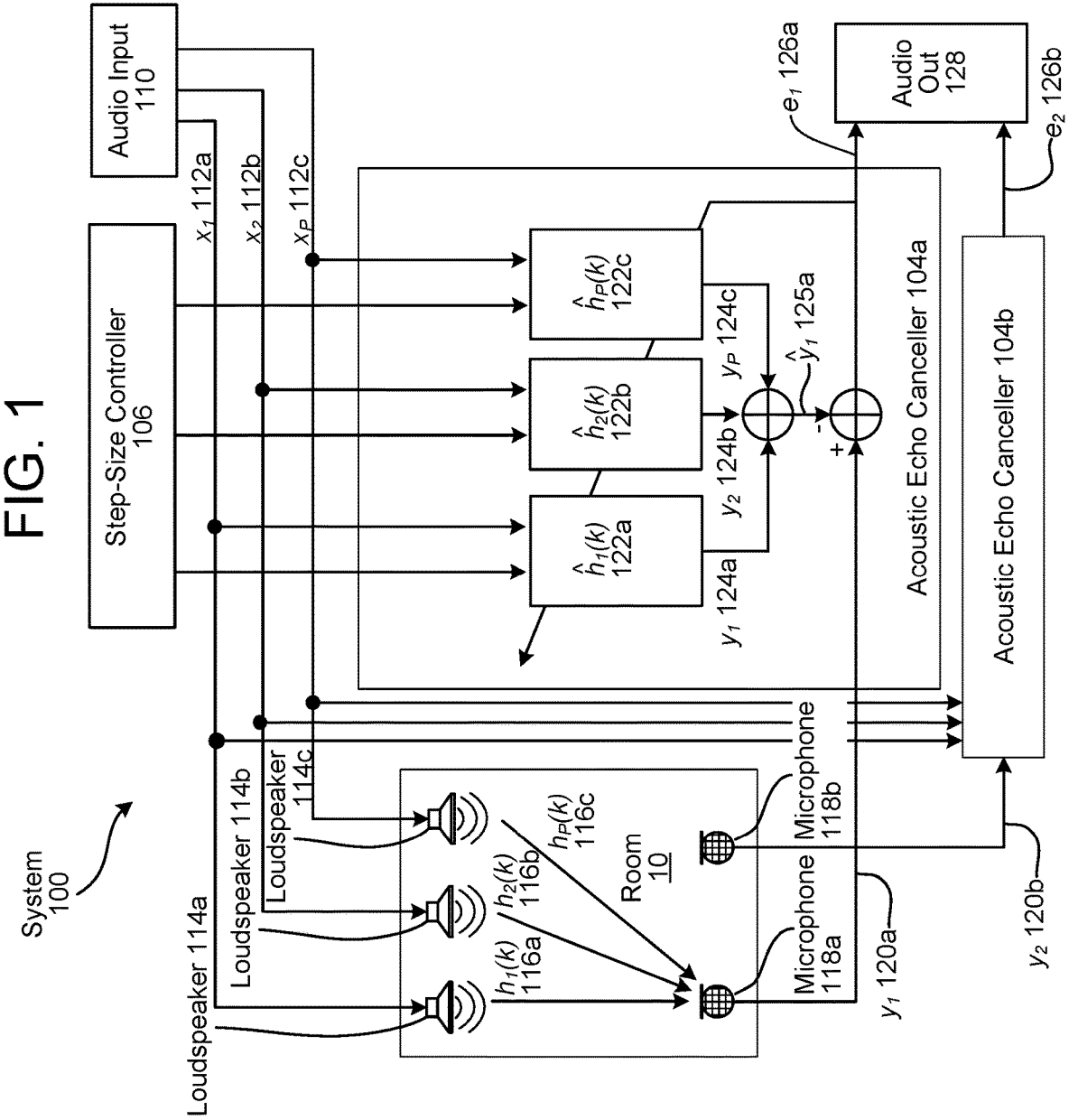
FIG. 1 illustrates an echo cancellation system that dynamically controls a step-size parameter according to embodiments of the present disclosure.

Acoustic echo cancellation (AEC) systems eliminate undesired echo due to coupling between a loudspeaker and a microphone. The main objective of AEC is to identify an acoustic impulse response in order to produce an estimate of the echo (e.g., estimated echo signal) and then subtract the estimated echo signal from the microphone signal. Many AEC systems use frequency-domain adaptive filters to estimate the echo signal. However, frequency-domain adaptive filters are highly influenced by the selection of a step-size parameter. For example, a large step-size value results in a fast convergence rate (e.g., short convergence period before the estimated echo signal matches the microphone signal) but has increased steady state error (e.g., errors when the system is stable) and is sensitive to local speech disturbance, whereas a small step-size value results in low steady state error and is less sensitive to local speech disturbance, but has a very slow convergence rate (e.g., long convergence period before the estimated echo signal matches the microphone signal). Thus, AEC systems using fixed step-sizes either prioritize a fast convergence rate or low steady state error.

Some AEC systems compromise by having variable step-size values, alternating between two or more step-size values. For example, an AEC system may determine when the signals are diverging or far apart (e.g., the estimated echo signal does not match the microphone signal and/or an error is increasing) and select a large step-size value, or determine when the signals are converging (e.g., the estimated echo signal is getting closer to the microphone signal and/or the error is decreasing) and select a small step-size value. While this compromise avoids the slow convergence rate and/or increased steady-state error of using the fixed step-size value, the AEC system must correctly identify when the signals are diverging or converging and there may be a delay when the system changes, such as when there is local speech or when an echo path changes (e.g., someone stands in front of the loudspeaker).

To improve echo cancellation and prevent divergence due to the presence of a near-end signal, devices, systems and methods are disclosed for dynamically controlling a step-size value for an adaptive filter using a robust algorithm. The step-size value may be controlled for each channel (e.g., speaker output) in a multi-channel AEC algorithm and may be individually controlled for each frequency subband (e.g., range of frequencies, referred to herein as a tone index) on a frame-by-frame basis (e.g., dynamically changing over time). The step-size value may be determined using a first cost function (e.g., $l_2$ norm) when a near-end signal is not present and using a second cost function (e.g., $l_1$ norm) when a near-end signal is present. The system may determine whether a near-end signal is present by determining a scaled error (e.g., error signal divided by reference signal) and comparing the scaled error to a threshold value. When the scaled error is less than or equal to the threshold value, the system may determine that a near-end signal is not present and may use the first cost function, whereas when the scaled error is greater than the threshold value, the system may determine that a near-end signal is present and may use the second cost function. The robust algorithm may prevent the system from diverging due to the presence of the near-end signal by selecting a different cost function to determine the step-size value and/or combining different step-size computations, which may result in the step-size being temporarily reduced. Thus, the robust algorithm may enable the AEC to better model the near-end disturbance statistics while the near-end signal is present.

FIG. 1 illustrates a high-level conceptual block diagram of echo-cancellation aspects of a multi-channel acoustic echo cancellation (AEC) system 100 in a time domain. In some examples, the system 100 may comprise a device 102 that may include acoustic echo cancellers 104, such as a first acoustic echo canceller 104a and a second acoustic echo canceller 104b, and a step-size controller 106 that controls step-size parameters used by the acoustic echo cancellers 104. While FIG. 1 only illustrates two acoustic echo cancellers 104a/104b, the disclosure is not limited thereto and the number of acoustic echo cancellers 104 may correspond to the number of microphone signals 120 (e.g., microphone audio signals) without departing from the disclosure. While the following description refers only to the first acoustic echo canceller 104a, the concepts may be applied to any of the acoustic echo cancellers 104 without departing from the disclosure.

While not illustrated in FIG. 1, the step-size controller 106 may receive playback signals 112 (e.g., 112a, 112b, 112c) (e.g., reference signals), microphone signal(s) 120 (e.g., 120a), estimated echo signals 124 (e.g., 124a, 124b, 124c), error signal(s) 126 (e.g., 126a), and/or other signals generated or used by the first acoustic echo canceller 104a and may determine step-size values and provide the step-size values to the first acoustic echo canceller 104a to be used by adaptive filters included in the first acoustic echo canceller 104a. The step-size values may be determined for individual channels (e.g., microphone signals 120) and/or tone indexes (e.g., frequency subbands) on a frame-by-frame basis. The first acoustic echo canceller 104a may use the step-size values to perform acoustic echo cancellation and generate a first error signal 126a, as will be discussed in greater detail below. Thus, the first acoustic echo canceller 104a may generate the first error signal 126a using first filter coefficients for the adaptive filters, the step-size controller 106 may use the playback signals 112 (e.g., 112a, 112b, 112c) (e.g., reference signals), the first error signal 126a, and/or other signals to determine a step-size value, and the adaptive filters may use the step-size value to generate second filter coefficients from the first filter coefficients.

As illustrated in FIG. 1, an audio input 110 provides audio playback signals $x_1(n)$ 112a, $x_2(n)$ 112b and $x_P(n)$ 112c, which may be referred to as reference signals 112 without departing from the disclosure. The number of reference signals 112 may correspond to a number of loudspeakers 114 associated with the system 100. For example, FIG. 1 illustrates an example in which a first reference signal $x_1(n)$ 112a is transmitted to a first loudspeaker 114a, a second reference signal $x_2(n)$ 112b is transmitted to a second loudspeaker 114b and a third reference signal $x_P(n)$ 112c is transmitted to a third loudspeaker 114c. Each loudspeaker 114 may output the received audio, and portions of the output sounds are captured by microphones 118, illustrated in FIG. 1 as a pair of microphone 118a/118b. While FIG. 1 illustrates two microphones 118a/118b, the disclosure is not limited thereto and the system 100 may include any number of microphones 118 without departing from the present disclosure.

The portion of the sounds output by each of the loudspeakers 114a/114b/114c that reaches each of the microphones 118a/118b can be characterized based on transfer functions. FIG. 1 illustrates transfer functions $h_1(n)$ 116a, $h_2(n)$ 116b and $h_P(n)$ 116c between the loudspeakers 114a/114b/114c (respectively) and the microphone 118a. The transfer functions 116 vary with the relative positions of the components and the acoustics of the room 10. If the position of all of the objects in a room 10 are static, the transfer functions are likewise static. Conversely, if the position of an object in the room 10 changes, the transfer functions may change.

The transfer functions (e.g., 116a, 116b, 116c) characterize the acoustic "impulse response" of the room 10 relative to the individual components. The impulse response, or impulse response function, of the room 10 characterizes the signal from a microphone when presented with a brief input signal (e.g., an audible noise), called an impulse. The impulse response describes the reaction of the system as a function of time. If the impulse response between each of the loudspeakers 116a/116b/116c is known, and the content of the reference signals $x_1(n)$ 112a, $x_2(n)$ 112b and $x_P(n)$ 112c output by the loudspeakers is known, then the transfer functions 116a, 116b and 116c can be used to estimate the actual loudspeaker-reproduced sounds that will be received by a microphone (in this case, microphone 118a). The microphone 118a converts the captured sounds into a signal $y_1(n)$ 120a. A second set of transfer functions may be associated with the second microphone 118b, which converts captured sounds into a signal $y_2(n)$ 120b, although the disclosure is not limited thereto and additional sets of transfer functions may be associated with additional microphones 118 without departing from the disclosure.

The "echo" signal $y_1(n)$ 120a contains some of the reproduced sounds from the reference signals $x_1(n)$ 112a, $x_2(n)$ 112b and $x_P(n)$ 112c, in addition to any additional sounds picked up in the room 10. Thus, the echo signal $y_1(n)$ 120a can be expressed as:

$$y_1(n)=h_1(n)*x_1(n)+h_2(n)*x_2(n)+h_P(n)*x_P(n) \quad [1]$$

where $h_1(n)$ 116a, $h_2(n)$ 116b and $h_P(n)$ 116c are the loudspeaker-to-microphone impulse responses in the receiving room 10, $x_1(n)$ 112a, $x_2(n)$ 112b and $x_P(n)$ 112c are the loudspeaker reference signals, * denotes a mathematical convolution, and "n" is an audio sample.

The acoustic echo canceller 104a calculates estimated transfer functions 122a, 122b and 122c, each of which model an acoustic echo (e.g., impulse response) between an individual loudspeaker 114 and an individual microphone 118. For example, a first estimated transfer function $\hat{h}_1(n)$ 122a models a first transfer function $h_1(n)$ 116a between the first loudspeaker 114a and the first microphone 118a, a second estimated transfer function $\hat{h}_2(n)$ 122b models a second transfer function $h_2(n)$ 116b between the second loudspeaker 114b and the first microphone 118a, and a third estimated transfer function $\hat{h}_P(n)$ 122c models a third transfer function $h_P(n)$ 116c between the third loudspeaker 114c and the first microphone 118a. These estimated transfer functions $\hat{h}_1(n)$ 122a, $\hat{h}_2(n)$ 122b and $\hat{h}_P(n)$ 122c are used to produce estimated echo signals $y_1(n)$ 124a, $y_2(n)$ 124b and $y_P(n)$ 124c, respectively.

To illustrate an example, the acoustic echo canceller 104a may convolve the reference signals 112 with the estimated transfer functions 122 (e.g., estimated impulse responses of the room 10) to generate the estimated echo signals 124. For example, the acoustic echo canceller 104a may convolve the first reference signal 112a by the first estimated transfer function $\hat{h}_1(n)$ 122a to generate the first estimated echo signal 124a, which models (e.g., represents) a first portion of the echo signal $y_1(n)$ 120a, may convolve the second reference signal 112b by the second estimated transfer function $\hat{h}_2(n)$ 122b to generate the second estimated echo signal 124b, which models (e.g., represents) a second portion of the echo signal $y_1(n)$ 120a, and may convolve the third reference signal 112c by the third estimated transfer function $\hat{h}_P(n)$ 122c to generate the third estimated echo signal 124c, which models (e.g., represents) a third portion of the echo signal $y_1(n)$ 120a.

The acoustic echo canceller 104a may determine the estimated echo signals 124 using adaptive filters, as discussed in greater detail below. For example, the adaptive filters may be normalized least means squared (NLMS) finite impulse response (FIR) adaptive filters that adaptively filter the reference signals 112 using filter coefficients. Thus, the first estimated transfer function $\hat{h}_1(n)$ 122a may correspond to a first adaptive filter that generates the first estimated echo signal 124a using a first plurality of adaptive filter coefficients, the second estimated transfer function $\hat{h}_2(n)$ 122b may correspond to a second adaptive filter that generates the second estimated echo signal 124b using a second plurality of adaptive filter coefficients, and the third estimated transfer function $\hat{h}_P(n)$ 122c may correspond to a third adaptive filter that generates the third estimated echo signal 124c using a third plurality of adaptive filter coefficients. The adaptive filters may update the adaptive filter coefficients over time, such that first adaptive filter coefficient values may correspond to the first adaptive filter and a first period of time, second adaptive filter coefficient values may correspond to the first adaptive filter and a second period of time, and so on.

The estimated echo signals 124 (e.g., 124a, 124b and 124c) may be combined to generate an estimated echo signal $\hat{y}_1(n)$ 125a corresponding to an estimate of the echo component in the echo signal $y_1(n)$ 120a. The estimated echo signal can be expressed as:

$$\hat{y}_1(n) = \hat{h}_1(k)*x_1(n) + \hat{h}_2(n)*x_2(n) + \hat{h}_p(n)*x_p(n) \quad [2]$$

where * again denotes convolution. Subtracting the estimated echo signal 125a from the echo signal 120a produces the first error signal $e_1(n)$ 126a. Specifically:

$$\hat{e}_1(n) = y_1(n) - \hat{y}_1(n) \quad [3]$$

The system 100 may perform acoustic echo cancellation for each microphone 118 (e.g., 118a and 118b) to generate error signals 126 (e.g., 126a and 126b). Thus, the first acoustic echo canceller 104a corresponds to the first microphone 118a and generates a first error signal $e_1(n)$ 126a, the second acoustic echo canceller 104b corresponds to the second microphone 118b and generates a second error signal $e_2(n)$ 126b, and so on for each of the microphones 118. The first error signal $e_1(n)$ 126a and the second error signal $e_2(n)$ 126b (and additional error signals 126 for additional microphones) may be combined as an output (i.e., audio output 128). While FIG. 1 illustrates the first acoustic echo canceller 104a and the second acoustic echo canceller 104b as discrete components, the disclosure is not limited thereto and the first acoustic echo canceller 104a and the second acoustic echo canceller 104b may be included as part of a single acoustic echo canceller 104.

The acoustic echo canceller 104a may calculate frequency domain versions of the estimated transfer functions $\hat{h}_1(n)$ 122a, $\hat{h}_2(n)$ 122b and $\hat{h}_p(n)$ 122c using short term adaptive filter coefficients W(k,r) that are used by adaptive filters. In conventional AEC systems operating in the time domain, the adaptive filter coefficients are derived using least mean squares (LMS), normalized least mean squares (NLMS) or stochastic gradient algorithms, which use an instantaneous estimate of a gradient to update an adaptive weight vector at each time step. With this notation, the LMS algorithm can be iteratively expressed in the usual form:

$$h_{new} = h_{old} + \mu * e * x \quad [4]$$

where $h_{new}$ is an updated transfer function, $h_{old}$ is a transfer function from a prior iteration, μ is the step size between samples, e is an error signal, and x is a reference signal. For example, the first acoustic echo canceller 104a may generate the first error signal 126a using first filter coefficients for the adaptive filters (corresponding to a previous transfer function $h_{old}$), the step-size controller 106 may use the first error signal 126a to determine a step-size value (e.g., μ), and the adaptive filters may use the step-size value to generate second filter coefficients from the first filter coefficients (corresponding to a new transfer function $h_{new}$). Thus, the adjustment between the previous transfer function $h_{old}$ and new transfer function $h_{new}$ is proportional to the step-size value (e.g., μ). If the step-size value is closer to one or greater than one, the adjustment is larger, whereas if the step-size value is closer to zero, the adjustment is smaller.

Applying such adaptation over time (i.e., over a series of samples), it follows that the error signal "e" (e.g., 126a) should eventually converge to zero for a suitable choice of the step size μ (assuming that the sounds captured by the microphone 118a correspond to sound entirely based on the references signals 112a, 112b and 112c rather than additional ambient noises, such that the estimated echo signal $\hat{y}_1(n)$ 125a cancels out the echo signal $y_1(n)$ 120a). However, e→0 does not always imply that h−ĥ→0, where the estimated transfer function ĥ cancelling the corresponding actual transfer function h is the goal of the adaptive filter. For example, the estimated transfer functions h may cancel a particular string of samples, but is unable to cancel all signals, e.g., if the string of samples has no energy at one or more frequencies. As a result, effective cancellation may be intermittent or transitory. Having the estimated transfer function approximate the actual transfer function h is the goal of single-channel echo cancellation, and becomes even more critical in the case of multichannel echo cancellers that require estimation of multiple transfer functions.

In order to perform acoustic echo cancellation, the time domain input signal y(n) 120 and the time domain reference signal x(n) 112 may be adjusted to remove a propagation delay and align the input signal y(n) 120 with the reference signal x(n) 112. The system 100 may determine the propagation delay using techniques known to one of skill in the art and the input signal y(n) 120 is assumed to be aligned for the purposes of this disclosure. For example, the system 100 may identify a peak value in the reference signal x(n) 112, identify the peak value in the input signal y(n) 120 and may determine a propagation delay based on the peak values.

The acoustic echo canceller(s) 104 may use short-time Fourier transform-based frequency-domain acoustic echo cancellation (STFT AEC) to determine step-size. The following high level description of STFT AEC refers to echo signal y (120) which is a time-domain signal comprising an echo from at least one loudspeaker (114) and is the output of a microphone 118. The reference signal x (112) is a time-domain audio signal that is sent to and output by a loudspeaker (114). The variables X and Y correspond to a Short Time Fourier Transform of x and y respectively, and thus represent frequency-domain signals. A short-time Fourier transform (STFT) is a Fourier-related transform used to determine the sinusoidal frequency and phase content of local sections of a signal as it changes over time.

Using a Fourier transform, a sound wave such as music or human speech can be broken down into its component "tones" of different frequencies, each tone represented by a sine wave of a different amplitude and phase. Whereas a time-domain sound wave (e.g., a sinusoid) would ordinarily be represented by the amplitude of the wave over time, a frequency domain representation of that same waveform comprises a plurality of discrete amplitude values, where each amplitude value is for a different tone or "bin." So, for example, if the sound wave consisted solely of a pure sinusoidal 1 kHz tone, then the frequency domain representation would consist of a discrete amplitude spike in the bin containing 1 kHz, with the other bins at zero. In other words, each tone "m" is a frequency index.

Figure 2A:
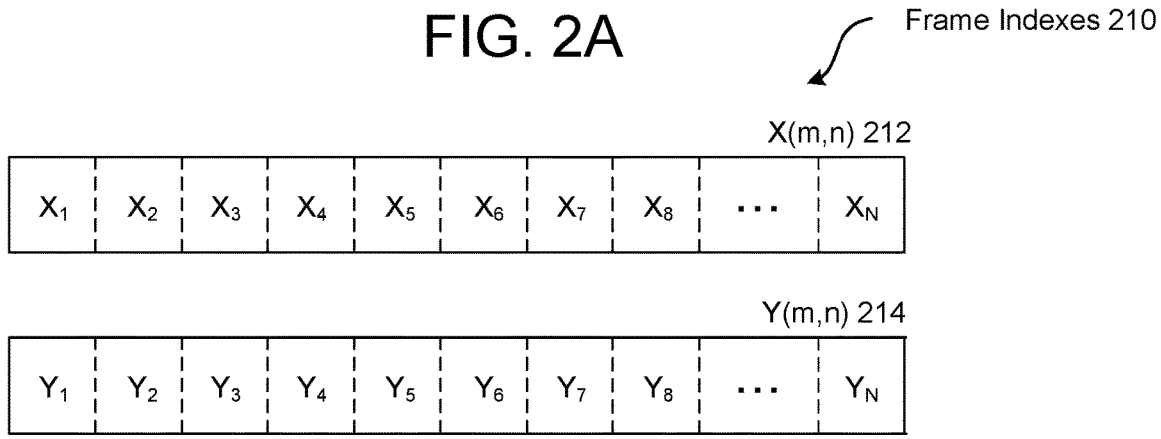
FIGS. 2A to 2C illustrate examples of channel indexes, tone indexes and frame indexes.

FIG. 2A illustrates an example of frame indexes 210 including reference values X(m,n) 212 and input values Y(m,n) 214. For example, the AEC 104 may apply a short-time Fourier transform (STFT) to the time-domain reference signal x(n) 112, producing the frequency-domain reference values X(m,n) 212, where the tone index "m" ranges from 0 to M and "n" is a frame index ranging from 0 to N. The AEC 104 may also apply an STFT to the time domain signal y(n) 120, producing frequency-domain input values Y(m,n) 214. As illustrated in FIG. 2A, the history of the values across iterations is provided by the frame index "n", which ranges from 1 to N and represents a series of samples over time.

Figure 2B:
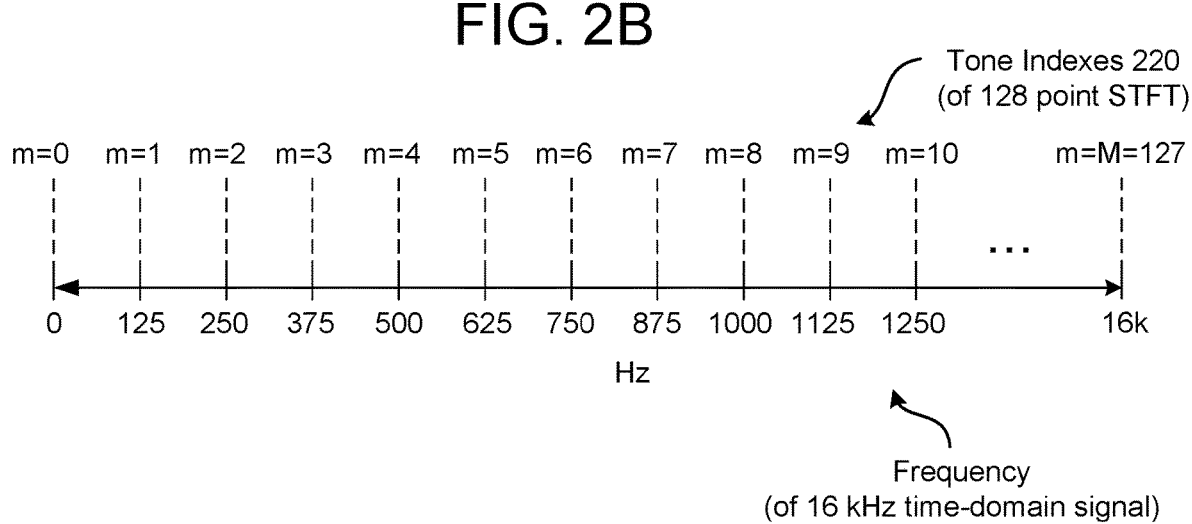
Figure 2C:
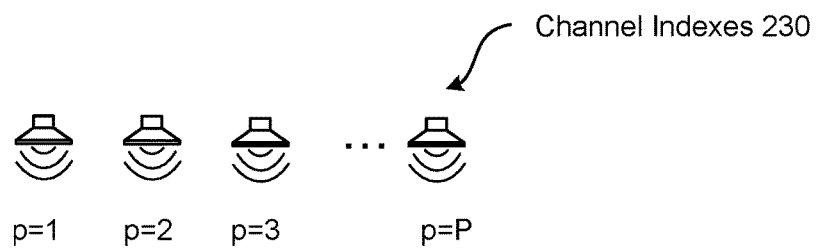

FIG. 2B illustrates an example of performing an M-point STFT on a time-domain signal. As illustrated in FIG. 2B, if a 128-point STFT is performed on a 16 kHz time-domain signal, the output is 128 complex numbers, where each complex number corresponds to a value at a frequency in increments of 16 kHz/128, such that there is 125 Hz between points, with point 0 corresponding to 0 Hz and point 127 corresponding to 16 kHz. As illustrated in FIG. 2B, each tone index 220 in the 128-point STFT corresponds to a frequency range (e.g., subband) in the 16 kHz time-domain signal. While FIG. 2B illustrates the frequency range being divided into 128 different subbands (e.g., tone indexes), the disclosure is not limited thereto and the system 100 may divide the frequency range into M different subbands without departing from the disclosure. While FIG. 2B illustrates the tone index 220 being generated using a Short-Time Fourier Transform (STFT), the disclosure is not limited thereto. Instead, the tone index 220 may be generated using Fast Fourier Transform (FFT), generalized Discrete Fourier Transform (DFT) and/or other transforms known to one of skill in the art (e.g., discrete cosine transform, non-uniform filter bank, etc.).

Given a signal z[n], the STFT Z(m,n) of z[n] is defined by $$Z(m, n) = \sum_{k=0}^{K-1} Win(k) * z(k + n * \mu) * e^{-2pi*m*k/K} \quad [5.1]$$

Where, Win(k) is a window function for analysis, m is a frequency index, n is a frame index, μ is a step-size (e.g., hop size), and K is an FFT size. Hence, for each block (at frame index n) of K samples, the STFT is performed which produces K complex tones X(m,n) corresponding to frequency index m and frame index n.

Referring to the input signal y(n) 120 from the microphone 118, Y(m,n) has a frequency domain STFT representation:

$$Y(m, n) = \sum_{k=0}^{K-1} Win(k) * y(k + n * \mu) * e^{-2pi*m*k/K} \quad [5.2]$$

Referring to the reference signal x(n) 112 to the loudspeaker 114, X(m,n) has a frequency domain STFT representation:

$$X(m, n) = \sum_{k=0}^{K-1} Win(k) * x(k + n * \mu) * e^{-2pi*m*k/K} \quad [5.3]$$

The system 100 may determine the number of tone indexes 220 and the step-size controller 106 may determine a step-size value for each tone index 220 (e.g., subband). Thus, the frequency-domain reference values X(m,n) 212 and the frequency-domain input values Y(m,n) 214 are used to determine individual step-size parameters for each tone index "m," generating individual step-size values on a frame-by-frame basis. For example, for a first frame index "1," the step-size controller 106 may determine a first step-size parameter μ(m) for a first tone index "m," a second step-size parameter μ(m+1) for a second tone index "m+1," a third step-size parameter μ(m+2) for a third tone index "m+2" and so on. The step-size controller 106 may determine updated step-size parameters for a second frame index "2," a third frame index "3," and so on.

As illustrated in FIG. 1, the system 100 may be a multi-channel AEC, with a first channel p (e.g., reference signal 112a) corresponding to a first loudspeaker 114a, a second channel (p+1) (e.g., reference signal 112b) corresponding to a second loudspeaker 114b, and so on until a final channel (P) (e.g., reference signal 112c) that corresponds to loudspeaker 114c. FIG. 2A illustrates channel indexes 230 including a plurality of channels from channel p to channel P. Thus, while FIG. 1 illustrates three channels (e.g., reference signals 112), the disclosure is not limited thereto and the number of channels may vary. For the purposes of discussion, an example of system 100 includes "P" loudspeakers 114 (P>1) and a separate microphone array system (microphones 118) for hands free near-end/far-end multichannel AEC applications.

For each channel of the channel indexes (e.g., for each loudspeaker 114), the step-size controller 106 may perform the steps discussed above to determine a step-size value for each tone index 220 on a frame-by-frame basis. Thus, a first reference frame index 212a and a first input frame index 214a corresponding to a first channel may be used to determine a first plurality of step-size values, a second reference frame index 212b and a second input frame index 214b corresponding to a second channel may be used to determine a second plurality of step-size values, and so on. The step-size controller 106 may provide the step-size values to adaptive filters for updating filter coefficients used to perform the acoustic echo cancellation (AEC). For example, the first plurality of step-size values may be provided to first AEC 104a, the second plurality of step-size values may be provided to second AEC 104b, and so on. The first AEC 104a may use the first plurality of step-size values to update filter coefficients from previous filter coefficients, as discussed above with regard to Equation 4. For example, an adjustment between the previous transfer function $h_{old}$ and new transfer function $h_{new}$ is proportional to the step-size value (e.g., μ). If the step-size value is closer to one or greater than one, the adjustment is larger, whereas if the step-size value is closer to zero, the adjustment is smaller.

Calculating the step-size values for each channel/tone index/frame index allows the system 100 to improve steady-state error, reduce a sensitivity to local speech disturbance and improve a convergence rate of the AEC 104. For example, the step-size value may be increased when the error signal 126 increases (e.g., the echo signal 120 and the estimated echo signal 125 diverge) to increase a convergence rate and reduce a convergence period. Similarly, the step-size value may be decreased when the error signal 126 decreases (e.g., the echo signal 120 and the estimated echo signal 125 converge) to reduce a rate of change in the transfer functions and therefore more accurately estimate the estimated echo signal 125.

FIG. 3 illustrates examples of convergence periods and steady state error associated with different step-size parameters. As illustrated in FIG. 3, a step-size parameter 310 may vary between a lower bound (e.g., 0) and an upper bound (e.g., 1). A system distance measures the similarity between the estimated impulse response and the true impulse response. Thus, a relatively small step-size value corresponds to system distance chart 320, which has a relatively long convergence period 322 (e.g., time until the estimated echo signal 125 matches the echo signal 120) but relatively low steady state error 324 (e.g., the estimated echo signal 125 accurately estimates the echo signal 120). In contrast, a relatively large step-size value corresponds to system distance chart 330, which has a relatively short convergence period 332 and a relatively large steady state error 334. While the large step-size value quickly matches the estimated echo signal 125 to the echo signal 120, the large step-size value prevents the estimated echo signal 125 from accurately estimating the echo signal 120 over time due to misadjustments caused by noise sensitivity and/or near-end speech (e.g., speech from a speaker in proximity to the microphone 118).

FIG. 4 illustrates an example of a convergence period and steady state error when a step-size parameter is controlled dynamically according to embodiments of the present disclosure. As illustrated in FIG. 4, the system 100 may control a step-size value of a dynamic step-size parameter 400 over multiple iterations, ranging from an initial step-size value of one to improve convergence rate down to a smaller step-size value to prevent misadjustments. System distance chart 410 illustrates the effect of the dynamic step-size parameter 400, which has a relatively short convergence period 412 and relatively low steady state error 414.

While FIG. 4 illustrates a static environment where the system 100 controls the dynamic step-size parameter 400 from an initial state to a steady-state, a typical environment is dynamic and changes over time. For example, objects in the room 10 may move (e.g., a speaker may step in front of a loudspeaker 114 and/or microphone 118) and change an echo path, ambient noise (e.g., conversation levels, external noises or intermittent noises or the like) in the room 10 may vary and/or near-end speech (e.g., speech from a speaker in proximity to the microphone 118) may be present. The system 100 may dynamically control the step-size parameter to compensate for these fluctuations in environment and/or echo path.

For example, when the system 100 begins performing AEC, the system 100 may control step-size values to be large in order for the system 100 to learn quickly and match the estimated echo signal to the microphone signal (e.g., microphone audio signal). As the system 100 learns the impulse responses and/or transfer functions, the system 100 may reduce the step-size values in order to reduce the error signal and more accurately calculate the estimated echo signal so that the estimated echo signal matches the microphone signal. In the absence of an external signal (e.g., near-end speech), the system 100 may converge so that the estimated echo signal closely matches the microphone signal and the step-size values become very small. If the echo path changes (e.g., someone physically stands between a loudspeaker 114 and a microphone 118), the system 100 may increase the step-size values to learn the new acoustic echo. In the presence of an external signal (e.g., near-end speech), the system 100 may decrease the step-size values so that the estimated echo signal is determined based on previously learned impulse responses and/or transfer functions and the system 100 outputs the near-end speech.

Additionally or alternatively, the step-size values may be distributed in accordance with the reference signals 112. For example, if one channel (e.g., reference signal 112a) is significantly louder than the other channels, the system 100 may increase a step-size value associated with the reference signal 112a relative to step-size values associated with the remaining reference signals 112. Thus, a first step-size value corresponding to the reference signal 112a will be relatively larger than a second step-size value corresponding to the reference signal 112b.

Figure 5:
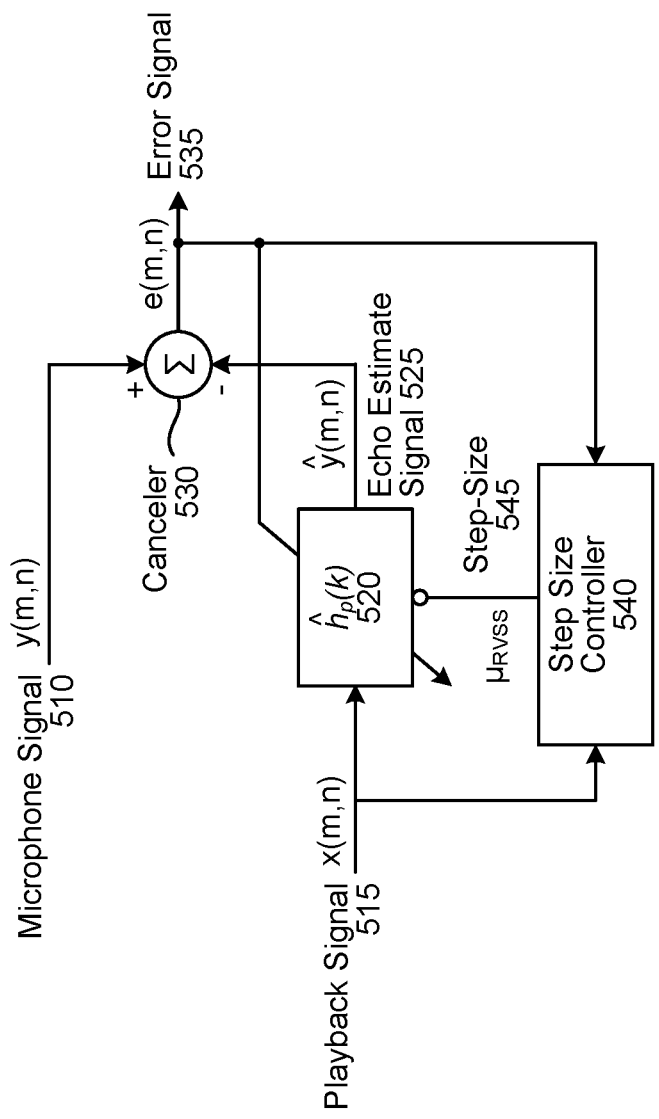
FIG. 5 illustrates an example component diagram for dynamically controlling a step-size parameter according to embodiments of the present disclosure.

FIG. 5 illustrates an example component diagram for dynamically controlling a step-size parameter according to embodiments of the present disclosure. As illustrated in FIG. 5, the system 100 may perform echo cancellation using a microphone signal 510 y(m, n) (e.g., microphone audio signal) and a playback signal 515 x(m, n) (e.g., reference audio signal). As described above, an estimated transfer function 520 $\hat{h}_p(k)$ may model or represent an acoustic echo (e.g., impulse response) between an individual loudspeaker 114 and an individual microphone 118. For example, the transfer function 520 $\hat{h}_p(k)$ may correspond to a first plurality of adaptive filter coefficient values associated with a first adaptive filter and the system 100 may use the first plurality of adaptive filter coefficient values to process the playback signal 515 x(m, n) and generate an echo estimate signal 525 ŷ(m, n). To perform echo cancellation, the system 100 may subtract the echo estimate signal 525 ŷ(m, n) from the microphone signal 510 y(m, n) to generate an error signal 535 e(m, n).

As illustrated in FIG. 5, the system 100 may perform echo cancellation in the subband domain, which helps the system 100 exert both time and frequency dependent adaptation controls. For example, the audio signals are represented in FIG. 5 with reference to a subband bin index m and a subband sample index n (e.g., x(m, n), y(m, n), ŷ(m, n), e(m, n)). However, the disclosure is not limited thereto and the system 100 may perform one or more steps associated with echo cancellation in the time domain (e.g., represented as x(n), y(n), ŷ(n), e(n)) and/or the frequency domain (e.g., represented as X(m, n), Y(m, n), Ŷ(m, n), E(m, n)) without departing from the disclosure.

As the system 100 performs echo cancellation in the subband domain, the system 100 may determine the echo estimate signal 525 ŷ(m, n) using an adaptive filter coefficients weight vector:

$$\underline{w}_p(m,n) \triangleq [w_p^0(m,n) w_p^1(m,n) \ldots w_p^{L-1}(m,n)] \quad [6]$$

where p denotes a playback signal (e.g., reference signal 112), m denotes a subband bin index (e.g., frequency bin), n denotes a subband sample index, L denotes a length of the room impulse response (RIR), and $w_p^l(m, n)$ denotes a particular weight value at the pth channel for the mth subband, the nth sample, and the lth time step.

Using the adaptive filter coefficients weight vector $\underline{w}_p(m, n)$, the system 100 may determine the echo estimate signal 525 ŷ(m, n) using the following equation:

$$\hat{y}_p(m, n) = \sum_{r=0}^{L-1} x_p(m, n-r) w_p^r(m, n) \quad [7]$$

where $\hat{y}_p(m, n)$ is the echo estimate of the pth channel for the mth subband and nth subband sample, $x_p$ is the playback signal (e.g., reference signal) for the pth channel, and $w_p^r(m, n)$ denotes the adaptive filter coefficients weight vector.

During conventional processing, the weight vector can be updated according to a subband normalized least mean squares (NLMS) algorithm:

$$\underline{w}_p(m, n) = \underline{w}_p(m, n-1) + \mu_p(m, n) \cdot \frac{\underline{x}_p(m, n)}{\|\underline{x}_p(m, n)\|^2 + \xi} \cdot e^*(m, n) \quad [8]$$

where $\underline{w}_p(m, n)$ denotes an adaptive filter coefficients weight vector for the pth channel, mth subband, and nth sample, $\mu_p(m, n)$ denotes an adaptation step-size value, $x_p(m, n)$ denotes the playback signal 515 (e.g., reference signal) for the pth channel, ξ is a nominal value to avoid dividing by zero (e.g., regularization parameter), and e*(m, n) denotes a conjugate of the error signal 535 output by the canceller 530.

Using the equations described above, the system 100 may adapt the first adaptive filter by updating the first plurality of filter coefficient values to a second plurality of filter coefficient values using the error signal 535. For example, the system 100 may update the weight vector associated with the first adaptive filter using Equation [8] in order adjust the echo estimate signal 525 and minimize the error signal 535. Applying such adaptation over time (i.e., over a series of samples), it follows that the error signal 535 should eventually converge to zero for a suitable choice of the step size μ in the absence of ambient noises or near-end signals (e.g., all audible sounds captured by the microphone 118a corresponds to the playback signals 112). The rate at which the system 100 updates the first adaptive filter is proportional to the step-size value (e.g., μ). If the step-size value is closer to one or greater than one, the adjustment is larger, whereas if the step-size value is closer to zero, the adjustment is smaller.

When a near-end signal (e.g., near-end speech or other audible sound that doesn't correspond to the playback signals 112) is present, however, the system 100 should output the near-end signal, which requires that the system 100 not update the first adaptive filter quickly enough to cause the adaptive filter to diverge from a converged state (e.g., cancel the near-end signal). For example, the near-end signal may correspond to near-end speech, which is a desired signal and the system 100 may process the near-end speech and/or output the near-end speech to a remote system for speech processing or the like. Alternatively, the near-end signal may correspond to an impulsive noise, which is not a desired signal but passes quickly, such that adapting causes the echo cancellation to diverge from a steady state condition.

To improve echo cancellation, the system 100 may select a different cost function to model the near-end signal differently. As illustrated in FIG. 5, the system 100 may determine a step-size value 545 $\mu_{RVSS}$ using a step size controller 540 according to embodiments of the present disclosure. For example, the system 100 may determine whether a near-end signal is present and either determine the step-size value 545 $\mu_{RVSS}$ using conventional techniques (e.g., when the near-end signal is not present) or determine the step-size value 545 $\mu_{RVSS}$ using a robust variable step-size (RVSS) algorithm as described in greater detail below. For example, the system 100 may determine that the near-end signal is present and determine the step-size value 545 $\mu_{RVSS}$ using the RVSS algorithm. Thus, the system 100 may select a different cost function used to update the adaptive filter coefficient values (e.g., weights), enabling the system 100 to better model the near-end disturbance statistics while the near-end signal is present. This may result in the system 100 selecting a lower step-size value, slowing a rate at which the adaptive filters update the plurality of filter coefficient values, although the disclosure is not limited thereto.

To stop the adaptive filter from diverging in the presence of a large near-end signal, the system 100 may constrain the filter update at each iteration:

$$\|\hat{w}_p(m,n) - \hat{w}_p(m,n-1)\|^2 \leq \delta \quad [9.1]$$

where $\hat{w}_p(m, n)$ denotes the RVSS weight vector (e.g., adaptive filter coefficients weight vector) for the pth channel, mth subband, and nth sample, $\hat{w}_p(m, n-1)$ denotes the RVSS weight vector for a previous sample (n−1), and δ denotes a threshold parameter. The system 100 may select a fixed value of the threshold parameter δ for all subbands and/or samples, although the disclosure is not limited thereto and in some examples the system 100 may determine the threshold parameter individually for each subband and sample (e.g., $\delta_{m,n}$). The cost function is as follows:

$$\hat{w}_p(m, n) = \underset{\hat{w}_p(m,n)}{\operatorname{argmin}} e(m, n)^2 \quad [9.2]$$

$$\text{s.t. } \|\hat{w}_p(m, n) - \hat{w}_p(m, n-1)\|^2 \leq \delta$$

where $\hat{w}_p(m, n)$ denotes the RVSS weight vector (e.g., adaptive filter coefficients weight vector) for the pth channel, mth subband, and nth sample, e (m, n) denotes the posteriori error signal, $\hat{w}_p(m, n-1)$ denotes the RVSS weight vector for a previous sample (n−1), and δ denotes a threshold parameter. The posteriori error signal may be defined as:

$$e(m,n) = (w_p(m,n) - \hat{w}_p(m,n))^H \cdot x_p(m,n) \quad [9.3]$$

where $x_p(m, n)$ denotes the playback signal 515 (e.g., reference signal) for the pth channel As illustrated in FIG. 5, the step size controller 540 may receive the playback signal 515 and the error signal 535 and may determine the step-size value 545 $\mu_{RVSS}$, which will be described in greater detail below with regard to FIGS. 6-8. The step size controller 540 may send the step-size value 545 $\mu_{RVSS}$ to the transfer function 520 (e.g., first adaptive filter) and the transfer function 520 may use the step-size value 545 $\mu_{RVSS}$ to control how quickly the first adaptive filter updates the plurality of filter coefficient values.

FIG. 6 illustrates examples of determining a step-size parameter according to embodiments of the present disclosure. As illustrated in FIG. 6, in some examples the system 100 may use a robust variable step-size (RVSS) weight vector 610, as shown below:

$$w_p(m, n) = \begin{cases} w_p(m, n-1) + \mu \cdot \dfrac{x_p(m, n)}{\|x_p(m, n)\|^2} \cdot e^*(m, n) & \text{if } \dfrac{|e(m, n)|}{\|x_p(m, n)\|} \leq \sqrt{\delta} \\ w_p(m, n-1) + \mu \cdot \sqrt{\delta} \cdot \\ \quad csgn(e(m, n))^* \cdot \dfrac{x_p(m, n)}{\|x_p(m, n)\|} & \text{if } \dfrac{|e(m, n)|}{\|x_p(m, n)\|} > \sqrt{\delta} \end{cases} \quad [10]$$

where $w_p(m, n)$ denotes the RVSS weight vector (e.g., adaptive filter coefficients weight vector) for the pth channel, mth subband, and nth sample, $\mu$ denotes an adaptation step-size value, $x_p(m, n)$ denotes the playback signal 515 (e.g., reference signal) for the pth channel, $\|x_p(m, n)\|$ denotes a vector norm (e.g., vector length, such as a Euclidian norm) associated with the playback signal 515, $e^*(m, n)$ denotes a conjugate of the error signal 535 output by the canceller 530, $|e_p(m, n)|$ denotes an absolute value of the error signal 535, $\sqrt{\delta}$ denotes a threshold value (e.g., square root of a threshold parameter $\delta$), and csgn( ) denotes a complex sign function (e.g., the sign of a complex number z is defined as z/|z|).

Thus, when the scaled error $|e(m,n)|/\|x_p(m,n)\|$ is less than or equal to the threshold value $\sqrt{\delta}$, the system 100 may update the weight vector using the NLMS algorithm described above with regard to Equation [8], whereas when the scaled error $|e(m,n)|/\|x_p(m,n)\|$ is greater than the threshold value $\sqrt{\delta}$, the system 100 may update the weight vector using the RVSS algorithm. This results in an algorithm that switches between minimizing one of two cost functions depending on the current near-end conditions; an $l_2$ norm when the near-end signal is not present, resulting in the usual NLMS update, or an $l_1$ norm when the near-end signal is present, resulting in a normalized sign update that is robust.

In some examples, this can be expressed in terms of a robust variable step-size (RVSS) value 620:

$$\mu_{RVSS} = \min\left[\sqrt{\delta} \cdot \dfrac{\|x_p(m, n)\|}{|e(m, n)|}, 1\right] \quad [11]$$

where $\mu_{RVSS}$ is the adaptation step-size (e.g., RVSS value 620) for the pth channel, mth subband, and nth sample, $\sqrt{\delta}$ denotes the threshold value described above (e.g., square root of a threshold parameter $\delta$), $\|x_p(m, n)\|$ denotes a vector norm (e.g., vector length, such as a Euclidian norm) associated with the playback signal 515, and $|e(m, n)|$ denotes an absolute value of the error signal 535. Thus, the RVSS value 620 may vary based on the threshold value $\sqrt{\delta}$ and the inverse of the scaled error (e.g., $\|x_p(m,n)\|/|e(m,n)|$) but Equation [11] prevents it from ever exceeding a maximum value of one.

Using the RVSS value above, the RVSS weight vector 630 may be represented as:

$$w_p(m, n) = w_p(m, n-1) + \mu_{RVSS} \cdot \mu_{fixed} \cdot \dfrac{x_p(m, n)}{\|x_p(m, n)\|^2} \cdot e^*(m, n) \quad [12]$$

where $w_p(m, n)$ denotes the RVSS weight vector (e.g., adaptive filter coefficients weight vector) for the pth channel, mth subband, and nth sample, $\mu_{RVSS}$ denotes the RVSS adaptation step-size value, $\mu_{fixed}$ denotes a fixed adaptation step-size value, $x_p(m, n)$ denotes the playback signal 515 (e.g., reference signal) for the pth channel, $\|x_p(m, n)\|$ denotes a vector norm (e.g., vector length, such as a Euclidian norm) associated with the playback signal 515, and $e^*(m, n)$ denotes a conjugate of the error signal 535 output by the canceller 530.

FIG. 7 is a flowchart conceptually illustrating an example method for dynamically controlling a step-size parameter according to embodiments of the present disclosure. As illustrated in FIG. 7, the system 100 may receive (510) a microphone signal, may receive (712) a playback signal, may determine (714) an echo estimate signal using the playback signal and adaptive filter coefficient values of an adaptive filter, and may determine (716) an error signal by subtracting the echo estimate signal from the microphone signal, as described in greater detail above with regard to FIG. 5.

The system 100 may determine (718) a step-size value using the error signal and the playback signal, as described above with regard to FIG. 6, and may update (720) the adaptive filter coefficient values using the step-size value and the error signal.

Figure 8:
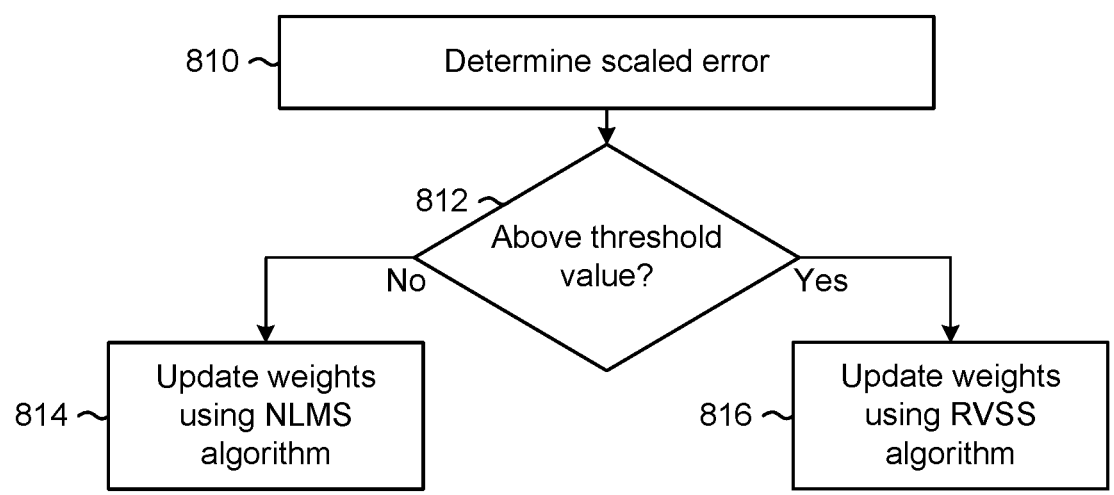
FIG. 8 is a flowchart conceptually illustrating an example method for determining when to update filter coefficients using a robust variable step size according to embodiments of the present disclosure.

FIG. 8 is a flowchart conceptually illustrating an example method for determining when to update filter coefficients using a robust variable step size according to embodiments of the present disclosure. As illustrated in FIG. 8, the system 100 may determine (810) a scaled error (e.g. $|e(m,n)|/\|x_p(m,n)\|$) and determine (812) whether the scaled error is above a threshold value. As described above with regard to FIG. 6, if the scaled error is less than or equal to the threshold value $\sqrt{\delta}$, the system 100 may update (814) weights using a normalized least means squared (NLMS) algorithm described above and illustrated in Equation [10]. If the scaled error is greater than the threshold value $\sqrt{\delta}$, the system 100 may update (816) weights using the robust variable step-size (RVSS) algorithm described above and illustrated in Equation [10].

Figure 9:
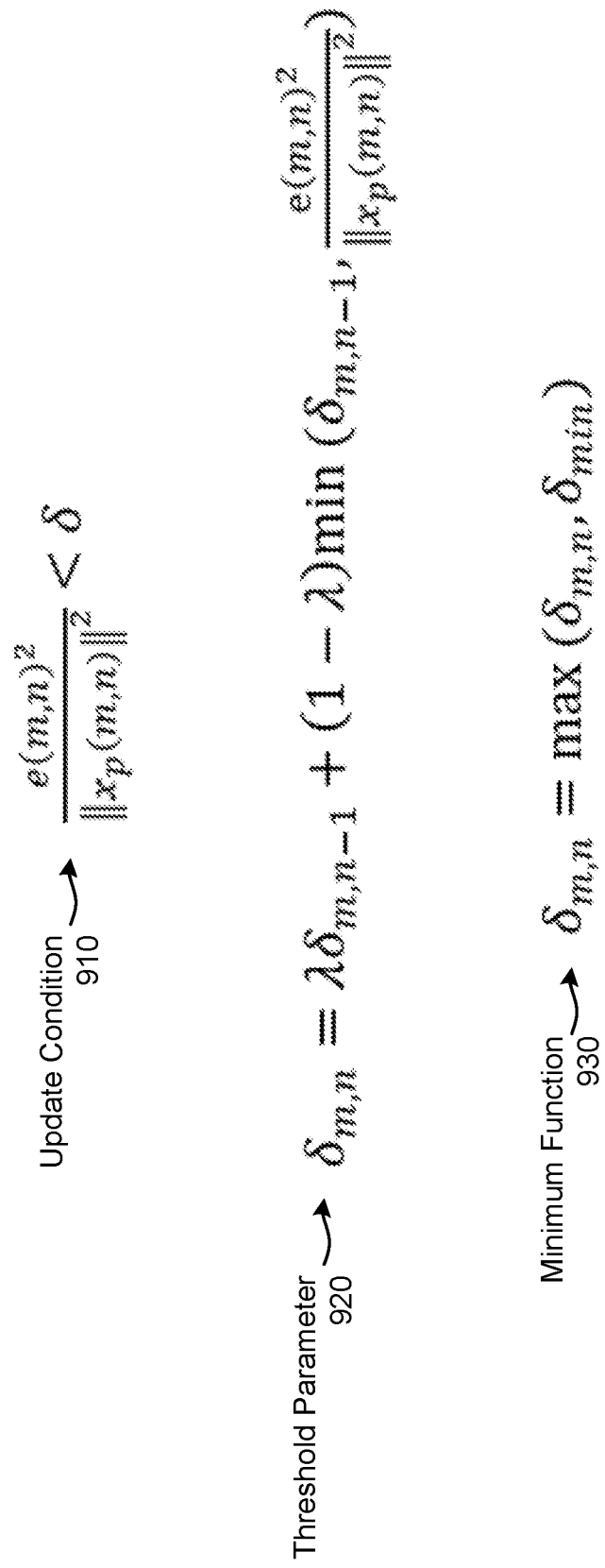
FIG. 9 illustrates examples of performing cost function selection according to embodiments of the present disclosure.

FIG. 9 illustrates examples of performing cost function selection according to embodiments of the present disclosure. As described above, the system 100 may compare the scaled error (e.g., $|e(m,n)|/\|x_p(m,n)\|$) to a threshold value $\sqrt{\delta}$ (e.g., square root of a threshold parameter $\delta$) to determine whether to apply the NLMS algorithm or the RVSS algorithm to determine a step-size parameter used to update the adaptive filters. In the examples described above, the threshold value $\sqrt{\delta}$ may be a fixed value that is predetermined for the system 100 and used during echo cancellation regardless of system conditions.

In some examples, however, the system 100 may dynamically determine the threshold value $\sqrt{\delta}$ by controlling the threshold parameter $\delta$. For example, the system 100 may initialize the threshold parameter $\delta$ to a higher value and then let it decay to a minimum value. This enables the system 100 to converge faster initially due to less constraints. The threshold parameter $\delta$ thus becomes time and frequency dependent, which may be represented as threshold parameter $\delta_{m,n}$.

To control when the threshold value $\sqrt{\delta}$ is modified, the system 100 may dynamically determine the threshold parameter $\delta_{m,n}$ when an update condition 910 is satisfied. As illustrated in FIG. 9, the update condition 910 corresponds to:

$$\frac{e(m, n)^2}{\|x_p(m, n)\|^2} < \delta \quad [13]$$

where $e_p(m, n)^2$ denotes a square of the error signal 535, $\|x_p(m, n)\|^2$ denotes a square of the vector norm (e.g., vector length, such as a Euclidian norm) associated with the playback signal 515, and $\delta$ represents a fixed value.

When the update condition 910 is satisfied, the system 100 may determine the threshold parameter $\delta_{k,m}$ 920 using the following equation:

$$\delta_{m,n} = \lambda \delta_{m,n-1} + (1-\lambda)\min\left(\delta_{m,n-1}, \frac{e(m, n)^2}{\|x_p(m, n)\|^2}\right) \quad [14]$$

where $\delta_{m,n}$ denotes the threshold parameter used to determine the threshold value for the mth subband and nth sample, $\lambda$ denotes a smoothing parameter having a value between zero and 1 (e.g., $0<\lambda<1$), $e(m,n)^2$ denotes a square of the error signal 535, and $\|x_p(m, n)\|^2$ denotes a square of the vector norm (e.g., vector length, such as a Euclidian norm) associated with the playback signal 515.

To avoid losing tracking capabilities, the system 100 may limit the threshold parameter $\delta_{m,n}$ to a minimum function 930, as shown below:

$$\delta_{m,n} = \max(\delta_{m,n}, \delta_{min}) \quad [15]$$

Thus, the threshold parameter $\delta_{m,n}$ is determined using Equation [14] or set equal to a minimum value (e.g., $\delta_{min}$). As the system 100 uses the threshold parameter $\delta_{m,n}$ to determine whether to use the NLMS algorithm or the RVSS algorithm (e.g., perform cost function selection), increasing the threshold parameter $\delta_{m,n}$ increases the threshold value $\sqrt{\delta}$, increasing a likelihood that the system 100 uses the NLMS algorithm to select step-size values. As the NLMS algorithm determines step-size values that are higher than the RVSS algorithm, increasing the threshold parameter $\delta_{m,n}$ increases the step-size values and therefore enables the system 100 to converge more rapidly.

Figure 10:
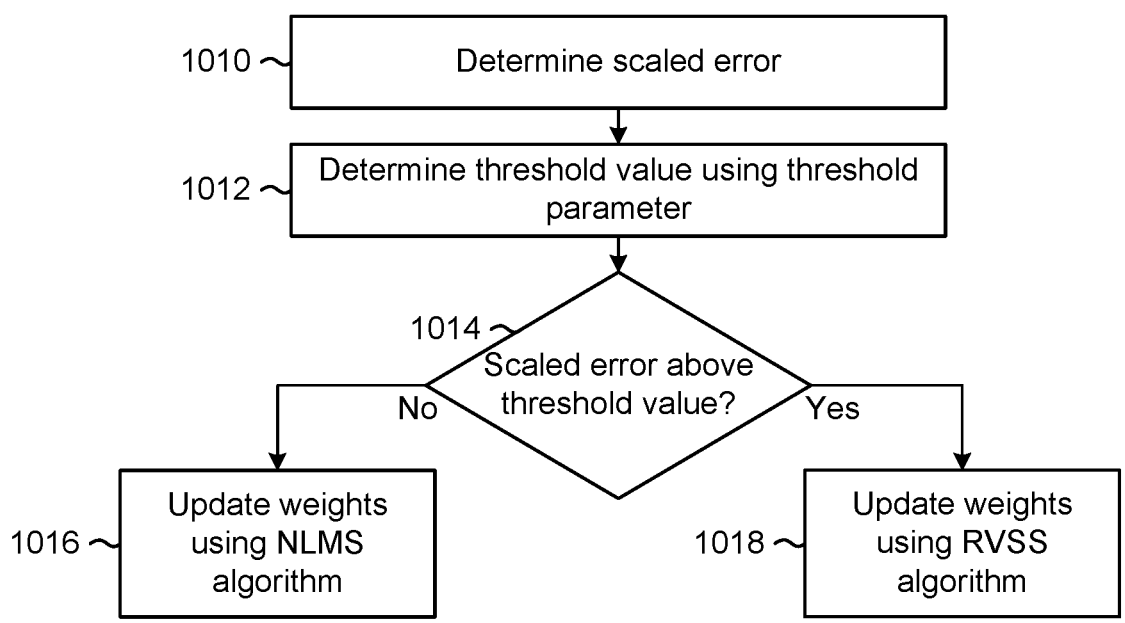
FIG. 10 is a flowchart conceptually illustrating an example method for determining when to update filter coefficient using a robust variable step size according to embodiments of the present disclosure.

FIG. 10 is a flowchart conceptually illustrating an example method for determining when to update filter coefficient using a robust variable step size according to embodiments of the present disclosure. As illustrated in FIG. 10, the system 100 may determine (1010) a scaled error (e.g., $|e(m,n)|/\|x_p(m,n)\|$) determine (1012) a threshold value using a threshold parameter $\delta_{m,n}$ as described above with regard to Equations [13]-[15], and determine (1014) whether the scaled error is above the threshold value. As described above with regard to FIG. 6, if the scaled error is less than or equal to the threshold value, the system 100 may update (1016) weights using a normalized least means squared (NLMS) algorithm described above and illustrated in Equation [10]. If the scaled error is greater than the threshold value, the system 100 may update (1018) weights using the robust variable step-size (RVSS) algorithm described above and illustrated in Equation [10].

Figure 11:
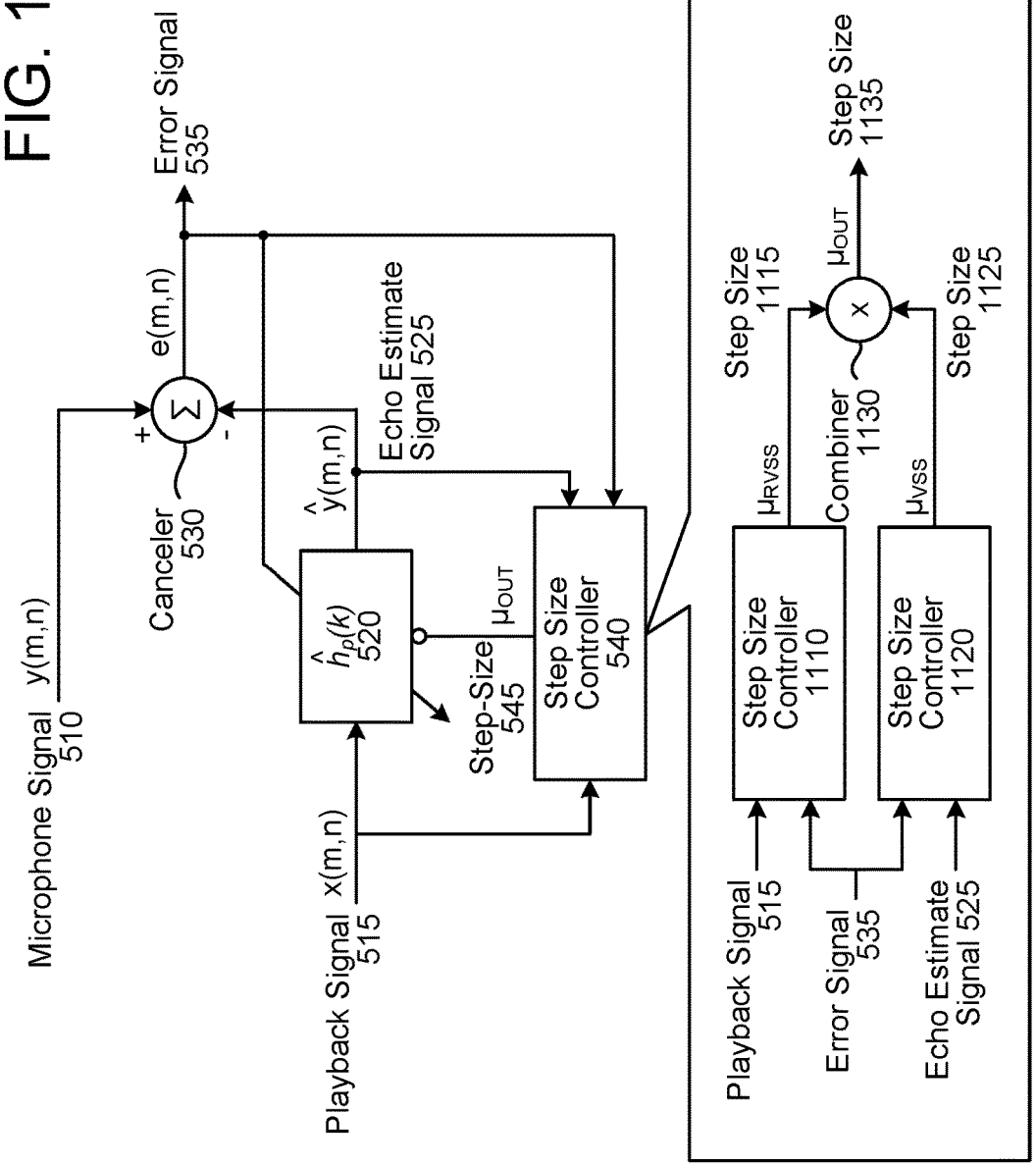
FIG. 11 illustrates an example component diagram for combining a robust variable step-size parameter with a variable step-size parameter according to embodiments of the present disclosure.

FIG. 11 illustrates an example component diagram for combining a robust variable step-size parameter with a variable step-size parameter according to embodiments of the present disclosure. As the components illustrated in FIG. 11 are identical to those described above with regard to FIG. 5, a redundant description is omitted. However, the example illustrated in FIG. 11 departs from the example illustrated in FIG. 5 with regard to how the step size controller 540 determines a step-size value. For example, the example illustrated in FIG. 11 generates the RVSS step-size value described above with regard to FIG. 5, but then combines the RVSS step-size value with a second step-size value to generate a step-size value 545 $\mu_{OUT}$.

As illustrated in FIG. 11, a first step size controller 1110 may receive the playback signal 515 and the error signal 535 and generate a first step-size value 1115 $\mu_{RVSS}$ using the robust variable step-size (RVSS) algorithm, as described in greater detail above with regard to FIG. 6. In addition, a second step size controller 1120 may receive the error signal 535 and the echo estimate signal 525 and generate a second step-size value 1125 $\mu_{VSS}$ using a variable step-size algorithm (VSS). For example, the VSS algorithm may dynamically determine a variable step-size value using techniques known to one of skill in the art. In some examples, the VSS algorithm may determine the second step-size value 1125 using a normalized squared cross-correlation (NSCC) between the error signal 535 and the estimate echo signal 525, although the disclosure is not limited thereto. As used herein, the VSS algorithm may refer to any known technique for dynamically generating a variable step-size value.

Instead of simply determining the variable step-size value using the VSS algorithm and then using the variable step-size value to update the adaptive filters, FIG. 11 illustrates that the system 100 may generate an output step-size value using the first step-size value 1115 $\mu_{RVSS}$ and the second step-size value 1125 $\mu_{VSS}$. For example, the system 100 may generate a third step-size value 1135 $\mu_{OUT}$ by multiplying the first step-size value 1115 $\mu_{RVSS}$ and the second step-size value 1125 $\mu_{VSS}$ using a combiner 1130. Thus, the first step-size value 1115 $\mu_{RVSS}$ generated by the RVSS algorithm may modify the second step-size value 1125 $\mu_{VSS}$ generated by the VSS algorithm to reduce a rate at which the adaptive filters update when near-end signals are detected. For example, when the near-end signal is not detected, the first step-size value 1115 $\mu_{RVSS}$ may be equal to a value of one, resulting in the third step-size value 1135 pour being equal to the second step-size value 1125 $\mu_{VSS}$. However, when a near-end signal is detected, the first step-size value 1115 $\mu_{RVSS}$ may have a value between zero and one, resulting in the third step-size value 1135 $\mu_{OUT}$ being smaller than the second step-size value 1125 $\mu_{VSS}$.

Using the first step-size value 1115 $\mu_{RVSS}$ and the second step-size value 1125 $\mu_{VSS}$, the system 100 may generate a RVSS weight vector 1140:

$$w_p(m, n) = w_p(m, n-1) + \mu_{RVSS} \cdot \mu_{VSS} \cdot \frac{x_p(m, n)}{\|x_p(m, n)\|^2} \cdot e^*(m, n) \quad [16]$$

where $w_p(m, n)$ denotes the RVSS weight vector (e.g., adaptive filter coefficients weight vector) for the pth channel, mth subband, and nth sample, $\mu_{RVSS}$ denotes the robust variable adaptation step-size value generated using the RVSS algorithm, $\mu_{VSS}$ denotes a variable adaptation step-size value generated using the VSS algorithm, $x_p(m, n)$ denotes the playback signal 515 (e.g., reference signal) for the pth channel, $\|x_p(m, n)\|$ denotes a vector norm (e.g., vector length, such as a Euclidian norm) associated with the playback signal 515, and e*(m, n) denotes a conjugate of the error signal 535 output by the canceller 530.

Figure 12:
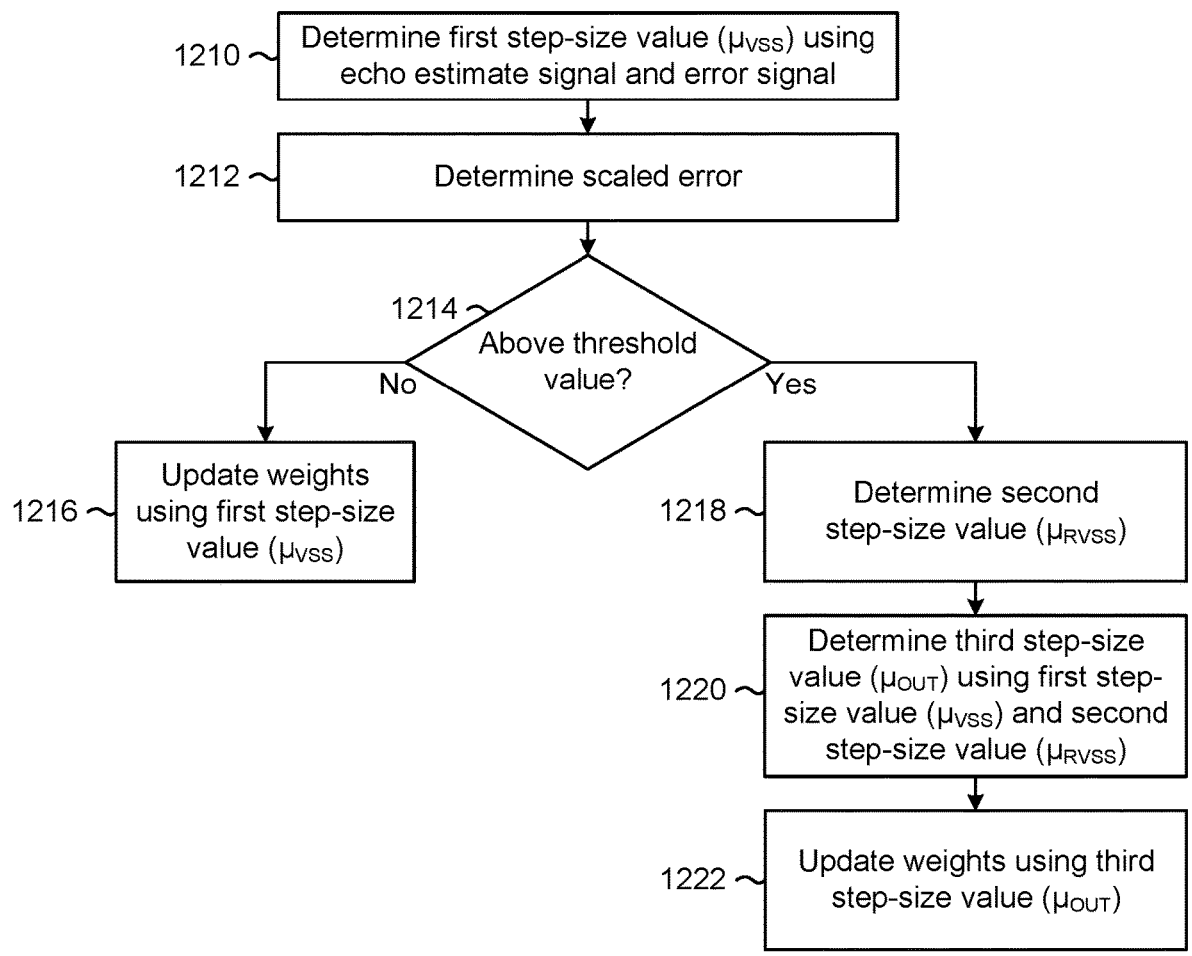
FIG. 12 is a flowchart conceptually illustrating an example method for determining when to use a robust variable step size according to embodiments of the present disclosure.

FIG. 12 is a flowchart conceptually illustrating an example method for determining when to use a robust variable step size according to embodiments of the present disclosure. As illustrated in FIG. 12, the system 100 may determine (1210) a first step-size value $\mu_{VSS}$ using an echo estimate signal and an error signal, determine (1212) a scaled error (e.g., |e(m,n)|/‖$x_p$(m,n)‖), and determine (1214) whether the scaled error is above a threshold value.

If the scaled error is less than or equal to the threshold value, the system 100 may update (1216) weights using the first step-size value $\mu_{VSS}$. If the scaled error is greater than the threshold value, the system 100 may determine (1218) a second step-size value $\mu_{RVSS}$, may determine (1220) a third step-size value $\mu_{OUT}$ using the first step-size value $\mu_{VSS}$ and the second step-size value $\mu_{RVSS}$, and may update (1222) weights using the third step-size value $\mu_{OUT}$.

Figure 13:
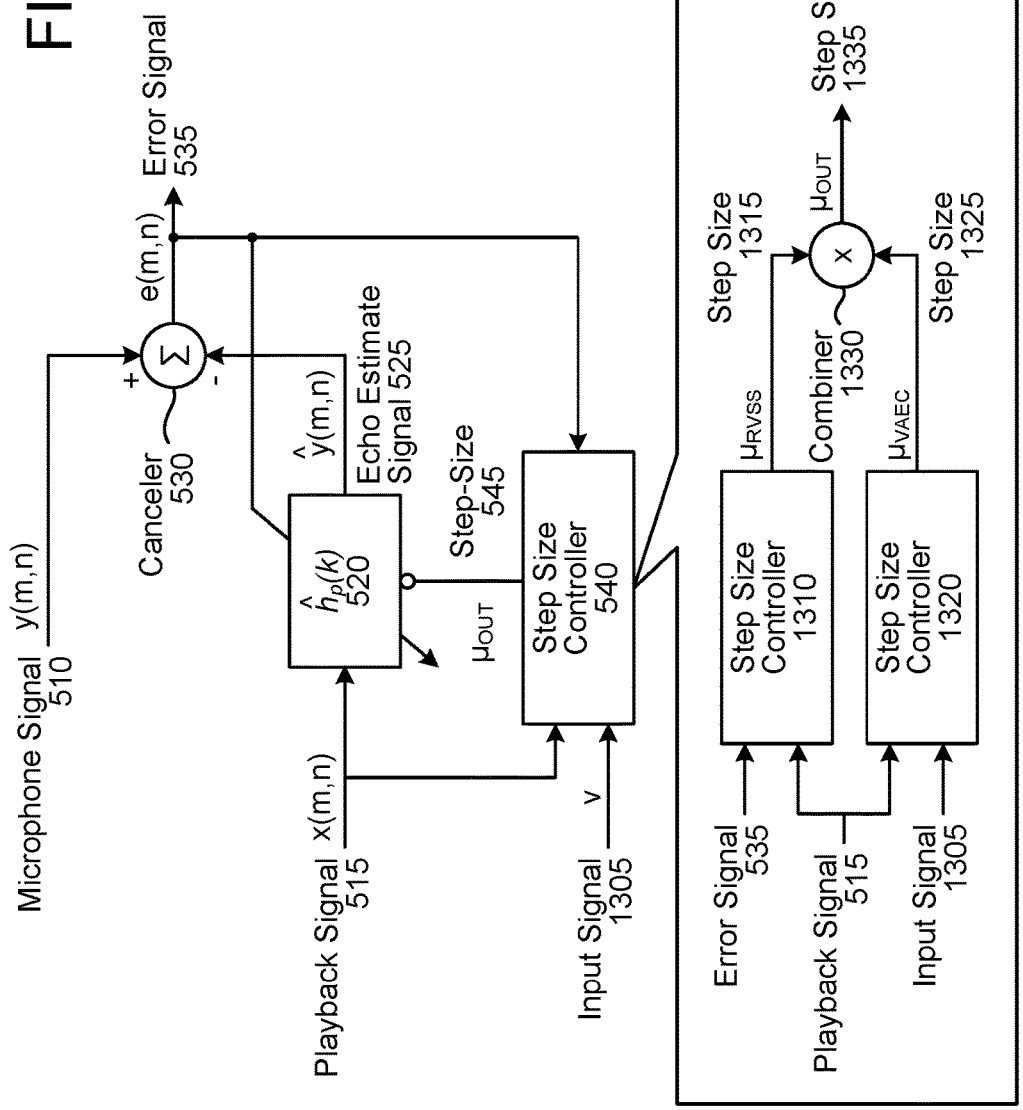
FIG. 13 illustrates an example component diagram for combining a robust variable step-size parameter with a velocity step-size parameter according to embodiments of the present disclosure.

FIG. 13 illustrates an example component diagram for combining a robust variable step-size parameter with a velocity step-size parameter according to embodiments of the present disclosure. As the components illustrated in FIG. 13 are identical to those described above with regard to FIG. 5, a redundant description is omitted. However, the example illustrated in FIG. 13 departs from the example illustrated in FIG. 5 with regard to how the step size controller 540 determines a step-size value. For example, the example illustrated in FIG. 13 generates the RVSS step-size value described above with regard to FIG. 5, but then combines the RVSS step-size value with a second step-size value to generate a step-size value 545 $\mu_{OUT}$.

As illustrated in FIG. 13, a first step size controller 1310 may receive the playback signal 515 and the error signal 535 and generate a first step-size value 1315 $\mu_{RVSS}$ using the robust variable step-size (RVSS) algorithm, as described in greater detail above with regard to FIG. 6. In addition, a second step size controller 1320 may receive the playback signal 515 and an input signal 1305 v (e.g., velocity signal or motion information) and generate a second step-size value 1325 $\mu_{VAEC}$ using a velocity-based step-size algorithm. For example, when the device 102 is a motile device and the input signal 1305 indicates a velocity of the device 102, the velocity-based algorithm may dynamically determine a variable step-size value based on the velocity of the device 102. Thus, when the velocity increases, the velocity-based algorithm may generate faster step-sizes to enable the system 100 to quickly adapt to a new environment, changes to an echo path, and/or changing impulse responses. As used herein, the velocity-based algorithm may refer to any technique for dynamically generating a variable step-size value based on a velocity of the device 102.

When the motile device is in motion, the device may create audible sounds (e.g., vibrations, rattling, road noise, etc.) that may disturb the adaptive filter coefficients. For example, the audible sounds may vary over time and be inconsistent, preventing the adaptive filter coefficients from cancelling this noise while also causing the adaptive filter to diverge. Instead of simply determining the second step-size value 1325 $\mu_{VAEC}$ using the velocity-based step-size algorithm and then using the second step-size value 1325 $\mu_{VAEC}$ to update the adaptive filters, FIG. 13 illustrates that the system 100 may generate an output step-size value using the first step-size value 1315 $\mu_{RVSS}$ and the second step-size value 1325 $\mu_{VAEC}$. For example, the system 100 may generate a third step-size value 1335 $\mu_{OUT}$ by multiplying the first step-size value 1315 $\mu_{RVSS}$ and the second step-size value 1325 $\mu_{VAEC}$ using a combiner 1330. Thus, the first step-size value 1315 $\mu_{RVSS}$ generated by the RVSS algorithm may modify the second step-size value 1325 $\mu_{VAEC}$ generated by the velocity-based algorithm to switch cost functions and/or reduce a rate at which the adaptive filters update when near-end signals are detected. For example, when the near-end signal is not detected, the first step-size value 1315 $\mu_{RVSS}$ may be equal to a value of one, resulting in the third step-size value 1335 $\mu_{OUT}$ being equal to the second step-size value 1325 $\mu_{VAEC}$. However, when a near-end signal is detected, the first step-size value 1315 $\mu_{RVSS}$ may have a value between zero and one, resulting in the third step-size value 1335 $\mu_{OUT}$ being smaller than the second step-size value 1325 $\mu_{VAEC}$. As the second step-size value 1325 $\mu_{VAEC}$ increases when the velocity increases to enable the system 100 to rapidly converge as the echo path changes, the first step-size value 1315 $\mu_{RVSS}$ slows down how quickly the adaptive filters update when near-end signals are present in order to prevent the system from diverging. Thus, the system 100 generates the third step-size value 1335 $\mu_{OUT}$ to be robust against near-end disturbances and instantaneously constrains the step-size when the impulsive noises occur.

Using the first step-size value 1315 $\mu_{RVSS}$ and the second step-size value 1325 $\mu_{VAEC}$, the system 100 may generate a RVSS weight vector 1340:

$$w_p(m, n) = w_p(m, n-1) + \mu_{RVSS} \cdot \mu_{VAEC} \cdot \frac{x_p(m, n)}{\|x_p(m, n)\|^2} \cdot e^*(m, n) \quad [17]$$

where $w_p$(m, n) denotes the RVSS weight vector (e.g., adaptive filter coefficients weight vector) for the pth channel, mth subband, and nth sample, $\mu_{RVSS}$ denotes the robust variable adaptation step-size value generated using the RVSS algorithm, $\mu_{VAEC}$ denotes a variable adaptation step-size value generated using the velocity-based algorithm, $x_p$(m, n) denotes the playback signal 515 (e.g., reference signal) for the pth channel, ‖$x_p$(m, n)‖ denotes a vector norm (e.g., vector length, such as a Euclidian norm) associated with the playback signal 515, and e*(m, n) denotes a conjugate of the error signal 535 output by the canceller 530.

Figure 14:
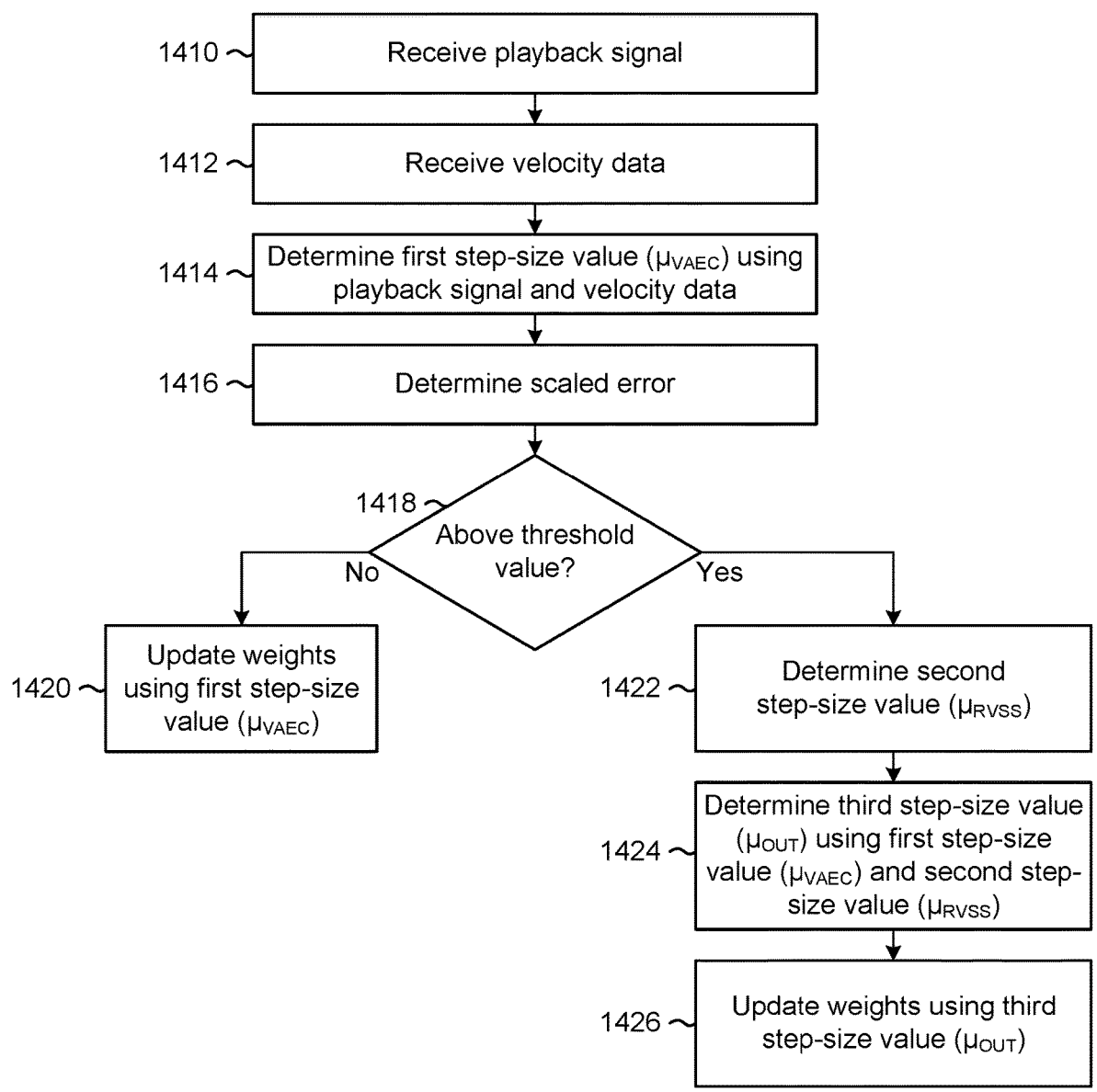
FIG. 14 is a flowchart conceptually illustrating an example method for determining when to use a robust variable step size according to embodiments of the present disclosure.

FIG. 14 is a flowchart conceptually illustrating an example method for determining when to use a robust variable step size according to embodiments of the present disclosure. As illustrated in FIG. 14, the system 100 may receive (1410) a playback signal, receive (1412) velocity data, and determine (1414) a first step-size value $\mu_{VAEC}$ using the playback signal and the velocity data. The system 100 may determine (1416) a scaled error (e.g. |e(m,n)|/‖$x_p$(m,n)‖, and determine (1418) whether the scaled error is above a threshold value.

If the scaled error is less than or equal to the threshold value, the system 100 may update (1420) weights using the first step-size value $\mu_{VAEC}$. If the scaled error is greater than the threshold value, the system 100 may determine (1422) a second step-size value $\mu_{RVSS}$, may determine (1424) a third step-size value $\mu_{OUT}$ using the first step-size value $\mu_{VAEC}$ and the second step-size value $\mu_{RVSS}$, and may update (1426) weights using the third step-size value $\mu_{OUT}$.

FIG. 15 is a block diagram conceptually illustrating a device 102 that may be used with the system 100. The device 102 may include one or more controllers/processors 1504, which may each include a central processing unit (CPU) for processing data and computer-readable instructions, and a memory 1506 for storing data and instructions of the respective device. The memory 1506 may include volatile random access memory (RAM), non-volatile read only memory (ROM), non-volatile magnetoresistive memory (MRAM), and/or other types of memory. The device 102 may also include a data storage component 1508 for storing data and controller/processor-executable instructions. Each data storage component 1508 may individually include one or more non-volatile storage types such as magnetic storage, optical storage, solid-state storage, etc. The device 102 may also be connected to removable or external non-volatile memory and/or storage (such as a removable memory card, memory key drive, networked storage, etc.) through respective input/output device interfaces 1502.

Computer instructions for operating the device 102 and its various components may be executed by the respective device's controller(s)/processor(s) 1504, using the memory 1506 as temporary "working" storage at runtime. A device's computer instructions may be stored in a non-transitory manner in non-volatile memory 1506, storage 1508, or an external device(s). Alternatively, some or all of the executable instructions may be embedded in hardware or firmware on the respective device in addition to or instead of software.

The device 102 includes input/output device interfaces 1502. A variety of components may be connected through the input/output device interfaces 1502, as will be discussed further below. Additionally, the device 102 may include an address/data bus 1524 for conveying data among components of the respective device. Each component within a device 102 may also be directly connected to other components in addition to (or instead of) being connected to other components across the bus 1524.

Referring to FIG. 15, the device 102 may include input/output device interfaces 1502 that connect to a variety of components such as an audio output component such as a loudspeaker 14, a wired headset or a wireless headset (not illustrated), or other component capable of outputting audio. The device 102 may also include an audio capture component. The audio capture component may be, for example, microphone(s) 118 or array of microphones, a wired headset, or a wireless headset, etc. If an array of microphones is included, approximate distance to a sound's point of origin may be determined by acoustic localization based on time and amplitude differences between sounds captured by different microphones of the array. The device 102 may optionally include a display 1516 for displaying content, although the disclosure is not limited thereto. While FIG. 15 illustrates the device 102 connecting to the loudspeaker 114, the antenna 1514, the display 1516, and the microphone(s) 118, the disclosure is not limited thereto and the device 102 may connect to any combination of these components without departing from the disclosure.

Via antenna(s) 1514, the input/output device interfaces 1502 may connect to one or more networks 199 via a wireless local area network (WLAN) (such as WiFi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Through the network(s) 199, the system may be distributed across a networked environment. The I/O device interface 1502 may also include communication components that allow data to be exchanged between devices such as different physical systems in a collection of systems or other components.

The components of the device 102 may include their own dedicated processors, memory, and/or storage. Alternatively, one or more of the components of the device 102 may utilize the I/O interfaces 1502, processor(s) 1504, memory 1506, and/or storage 1508 of the device 102.

As noted above, multiple devices may be employed in a single system. In such a multi-device system, each of the devices may include different components for performing different aspects of the system's processing. The multiple devices may include overlapping components. The components of the device 102, as described herein, are illustrative, and may be located as a stand-alone device or may be included, in whole or in part, as a component of a larger device or system.

The concepts disclosed herein may be applied within a number of different devices and computer systems, including, for example, general-purpose computing systems, speech processing systems, and distributed computing environments. The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of system may be implemented as in firmware or hardware, such as an acoustic front end (AFE), which comprises, among other things, analog and/or digital filters (e.g., filters configured as firmware to a digital signal processor (DSP)).

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method, the method comprising:
   receiving, by an autonomous motile device, a first reference audio signal;
   generating, by a first loudspeaker of the autonomous motile device using the first reference audio signal, an audible sound;
   receiving, from a microphone of the autonomous motile device, a first microphone signal including a first representation of the audible sound;
   determining, using the first reference audio signal and a first plurality of filter coefficient values of a first adaptive filter, a first echo estimate signal that represents a portion of the first microphone signal;
   determining a combined echo estimate signal by summing a plurality of echo estimate signals that includes the first echo estimate signal and a second echo estimate signal corresponding to a second reference audio signal;
   determining an error signal by subtracting the combined echo estimate signal from the first microphone signal;
   determining a first value by dividing an absolute value of the error signal by a second value representing a vector length of the first reference audio signal, the first value representing a scaled error for the first reference audio signal;
   determining that the first value exceeds a first threshold value, the first threshold value representing a transition from a first cost function to a second cost function;
   determining a first step-size value using the first reference audio signal and the error signal, wherein the first step-size value corresponds to a rate at which the first adaptive filter updates; and
   determining a second plurality of filter coefficient values for the first adaptive filter using the error signal, the first step-size value, and the first plurality of filter coefficient values.

2. The computer-implemented method of claim 1, wherein determining the first step-size value comprises:
   determining a second step-size value using the vector length of the first reference audio signal and the error signal, wherein the second step-size value corresponds to the rate at which the first adaptive filter updates;
   determining a third step-size value using the combined echo estimate signal and the error signal, wherein the third step-size value corresponds to the rate at which the first adaptive filter updates; and
   determining the first step-size value by multiplying the second step-size value and the third step-size value.

3. The computer-implemented method of claim 1, wherein determining the first step-size value comprises:
   determining a second step-size value using the vector length of the first reference audio signal and the error signal, wherein the second step-size value corresponds to the rate at which the first adaptive filter updates;
   determining a third step-size value using the first reference audio signal and velocity data indicating a speed of the autonomous motile device, wherein the third step-size value corresponds to the rate at which the first adaptive filter updates; and
   determining the first step-size value by multiplying the second step-size value and the third step-size value.

4. The computer-implemented method of claim 1, further comprising:
   determining a second value by dividing a square of the error signal by a square of the vector length of the first reference audio signal;
   determining that the second value is below a second threshold value; and
   determining the first threshold value by dividing the error signal by the vector length of the first reference audio signal.

5. A computer-implemented method performed by a device, the method comprising:
   receiving a first reference signal corresponding to a first audio channel;
   receiving a second reference signal corresponding to a second audio channel;
   receiving a first audio input signal;
   determining, using the first reference signal and a first adaptive filter, a first echo signal that represents a first portion of the first audio input signal;
   determining, using the second reference signal and a second adaptive filter, a second echo signal that represents a second portion of the first audio input signal;
   generating a first combined echo signal using the first echo signal and the second echo signal;
   determining a first error signal using the first combined echo signal and the first audio input signal;
   determining a first value using the first error signal and the first reference signal, the first value representing a first scaled error associated with the first reference signal;
   determining that the first value exceeds a first threshold value, the first threshold value representing a transition from a first cost function to a second cost function; and
   determining a first step-size value using the second cost function, the first reference signal, and the first error signal, wherein the first step-size value corresponds to a rate at which the first adaptive filter updates.

6. The computer-implemented method of claim 5, further comprising:
   determining, using the first step-size value, a first plurality of filter coefficient values associated with the first adaptive filter;
   determining a second step-size value using the second reference signal and the first error signal, wherein the second step-size value corresponds to a rate at which the second adaptive filter updates; and
   determining, using the second step-size value, a second plurality of filter coefficient values associated with the second adaptive filter.

7. The computer-implemented method of claim 6, further comprising:
   receiving a third reference signal corresponding to the first audio channel;
   receiving a fourth reference signal corresponding to the second audio channel;
   receiving a second audio input signal;
   determining, using the third reference signal and the first plurality of filter coefficient values, a third echo signal that represents a first portion of the second audio input signal; and determining, using the fourth reference signal and the second plurality of filter coefficient values, a fourth echo signal that represents a second portion of the second audio input signal.

8. The computer-implemented method of claim 5, further comprising:
receiving a third reference signal corresponding to the first audio channel;
receiving a fourth reference signal corresponding to the second audio channel;
receiving a second audio input signal;
determining, using the third reference signal and the first adaptive filter, a third echo signal that represents a first portion of the second audio input signal;
determining, using the fourth reference signal and the second adaptive filter, a fourth echo signal that represents a second portion of the second audio input signal;
generating a second combined echo signal using the third echo signal and the fourth echo signal;
determining a second error signal using the second combined echo signal and the second audio input signal;
determining a second value using the second error signal and the third reference signal;
determining that the second value is below the first threshold value; and
determining a second step-size value using the third reference signal, the second error signal, and the first cost function, the first cost function configured to minimize the second error signal,
wherein the second cost function is configured to minimize the first error signal.

9. The computer-implemented method of claim 5, wherein determining the first step-size value comprises:
determining a second value using the first reference signal and the first error signal;
determining a third value using the combined echo signal and the first error signal; and
determining the first step-size value using the second value and the third value.

10. The computer-implemented method of claim 5, wherein determining the first step-size value comprises:
determining a second value using the first reference signal and the first error signal;
determining a third value using the first reference signal and velocity data indicating a speed of the device; and
determining the first step-size value using the second value and the third value.

11. The computer-implemented method of claim 5, further comprising:
determining a second value using the first error signal and the first reference signal;
determining that the second value is below a second threshold value, the second threshold value indicating that the first reference signal is represented in the first error signal; and
determining the first threshold value using the first error signal and the first reference signal.

12. The computer-implemented method of claim 5, wherein determining the first echo signal further comprises:
estimating a first transfer function corresponding to an impulse response between a first loudspeaker and a microphone, wherein the first loudspeaker corresponds to the first audio channel and the microphone corresponds to the first audio input signal;

determining a weight vector based on the first transfer function, the weight vector corresponding to filter coefficient values associated with the first adaptive filter; and
determining the first echo signal by convolving the first reference signal with the weight vector.

13. A system comprising:
at least one processor; and
memory including instructions operable to be executed by the at least one processor to cause the system to:
receive, by a device, a first reference signal corresponding to a first audio channel;
receive a second reference signal corresponding to a second audio channel;
receive a first audio input signal;
determine, using the first reference signal and a first adaptive filter, a first echo signal that represents a first portion of the first audio input signal;
determine, using the second reference signal and a second adaptive filter, a second echo signal that represents a second portion of the first audio input signal;
generate a first combined echo signal using the first echo signal and the second echo signal;
determine a first error signal using the first combined echo signal and the first audio input signal;
determine a first value using the first error signal and the first reference signal, the first value representing a scaled error associated with the first reference signal;
determine that the first value exceeds a first threshold value, the first threshold value representing a transition from a first cost function to a second cost function; and
determine a first step-size value using the second cost function, the first reference signal, and the first error signal, wherein the first step-size value corresponds to a rate at which the first adaptive filter updates.

14. The system of claim 13, wherein the memory further comprises instructions that, when executed by the at least one processor, further cause the system to:
determine, using the first step-size value, a first plurality of filter coefficient values associated with the first adaptive filter;
determine a second step-size value using the second reference signal and the first error signal, wherein the second step-size value corresponds to a rate at which the second adaptive filter updates; and
determine, using the second step-size value, a second plurality of filter coefficient values associated with the second adaptive filter.

15. The system of claim 14, wherein the memory further comprises instructions that, when executed by the at least one processor, further cause the system to:
receive a third reference signal corresponding to the first audio channel;
receive a fourth reference signal corresponding to the second audio channel;
receive a second audio input signal;
determine, using the third reference signal and the first plurality of filter coefficient values, a third echo signal that represents a first portion of the second audio input signal; and
determine, using the fourth reference signal and the second plurality of filter coefficient values, a fourth echo signal that represents a second portion of the second audio input signal.

16. The system of claim 13, wherein the memory further comprises instructions that, when executed by the at least one processor, further cause the system to:
receive a third reference signal corresponding to the first audio channel;
receive a fourth reference signal corresponding to the second audio channel;
receive a second audio input signal;
determine, using the third reference signal and the first adaptive filter, a third echo signal that represents a first portion of the second audio input signal;
determine, using the fourth reference signal and the second adaptive filter, a fourth echo signal that represents a second portion of the second audio input signal;
generate a second combined echo signal using the third echo signal and the fourth echo signal;
determine a second error signal using the second combined echo signal and the second audio input signal;
determine a second value using the second error signal and the third reference signal;
determine that the second value is below the first threshold value; and
determine a second step-size value using the third reference signal, the second error signal, and the first cost function, the first cost function configured to minimize the second error signal,
wherein the second cost function is configured to minimize the first error signal.

17. The system of claim 13, wherein the memory further comprises instructions that, when executed by the at least one processor, further cause the system to:
determine a second value using the first reference signal and the first error signal;
determine a third value using the combined echo signal and the first error signal; and
determine the first step-size value using the second value and the third value.

18. The system of claim 13, wherein the memory further comprises instructions that, when executed by the at least one processor, further cause the system to:
determine a second value using the first reference signal and the first error signal;
determine a third value using the first reference signal and velocity data indicating a speed of the device; and
determine the first step-size value using the second value and the third value.

19. The system of claim 13, wherein the memory further comprises instructions that, when executed by the at least one processor, further cause the system to:
determine a second value using the first error signal and the first reference signal;
determine that the second value is below a second threshold value, the second threshold value indicating that the first reference signal is represented in the first error signal; and
determine the first threshold value using the first error signal and the first reference signal.

20. The system of claim 13, wherein the memory further comprises instructions that, when executed by the at least one processor, further cause the system to:
estimate a first transfer function corresponding to an impulse response between a first loudspeaker and a microphone, wherein the first loudspeaker corresponds to the first audio channel and the microphone corresponds to the first audio input signal;
determine a weight vector based on the first transfer function, the weight vector corresponding to filter coefficient values associated with the first adaptive filter; and
determine the first echo signal by convolving the first reference signal with the weight vector.

* * * * *